US008287374B2

(12) United States Patent
Pryor

(10) Patent No.: US 8,287,374 B2
(45) Date of Patent: Oct. 16, 2012

(54) RECONFIGURABLE CONTROL DISPLAYS FOR GAMES, TOYS, AND OTHER APPLICATIONS

(76) Inventor: Timothy R. Pryor, Tecumseh (CA)

(*) Notice: Subject to any disclaimer, the term of this patent is extended or adjusted under 35 U.S.C. 154(b) by 1223 days.

(21) Appl. No.: 10/934,762

(22) Filed: Sep. 7, 2004

(65) Prior Publication Data

US 2005/0064936 A1 Mar. 24, 2005

Related U.S. Application Data

(63) Continuation-in-part of application No. PCT/US2004/009701, filed on Mar. 31, 2004, and a continuation-in-part of application No. 10/611,814, filed on Jul. 2, 2003, now Pat. No. 7,489,303, and a continuation-in-part of application No. 09/789,538, filed on Feb. 22, 2001, now Pat. No. 7,084,859, and a continuation-in-part of application No. 09/612,225, filed on Jul. 7, 2000, now Pat. No. 6,766,036.

(60) Provisional application No. 60/499,890, filed on Sep. 4, 2003, provisional application No. 60/502,271, filed on Sep. 12, 2003, provisional application No. 60/539,578, filed on Jan. 29, 2004.

(51) Int. Cl.
*G06F 17/00* (2006.01)

(52) U.S. Cl. .................... 463/37; 463/36; 463/30
(58) Field of Classification Search .......... 463/30, 463/36, 37
See application file for complete search history.

(56) References Cited

U.S. PATENT DOCUMENTS

| 5,700,193 | A | * | 12/1997 | d'Achard Van Enschut | ..... 463/3 |
| 5,720,663 | A | * | 2/1998 | Nakatani et al. | ........ 463/23 |
| 6,036,188 | A | * | 3/2000 | Gomez et al. | ....... 273/118 R |
| 6,278,441 | B1 | * | 8/2001 | Gouzman et al. | ....... 345/163 |
| 2001/0000779 | A1 | * | 5/2001 | Hayama et al. | ........ 463/30 |

* cited by examiner

*Primary Examiner* — Michael Cuff
(74) *Attorney, Agent, or Firm* — Stites & Harbison PLLC; Douglas E. Jackson

(57) ABSTRACT

Disclosed herein are new forms of computer inputs particularly using TV cameras, and providing affordable methods and apparatus for unique game play, such as rear projection devices for pinball and common board games using machine vision to determine the location of objects and/or features of objects. Particular embodiments employing fast and reliable acquisition and tracking of game related objects and their motion are disclosed, together with numerous applications. Also disclosed are related embodiments for instrumentation and control systems, such as those used in homes and cars.

23 Claims, 25 Drawing Sheets

Figure 1
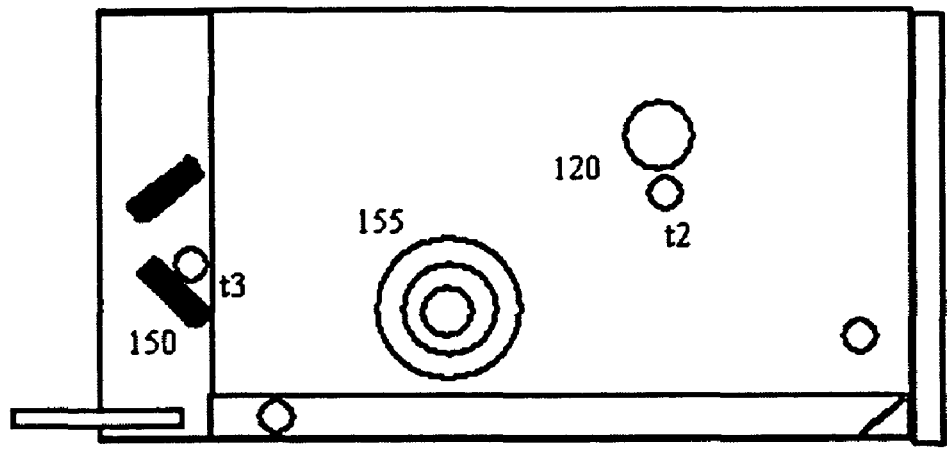
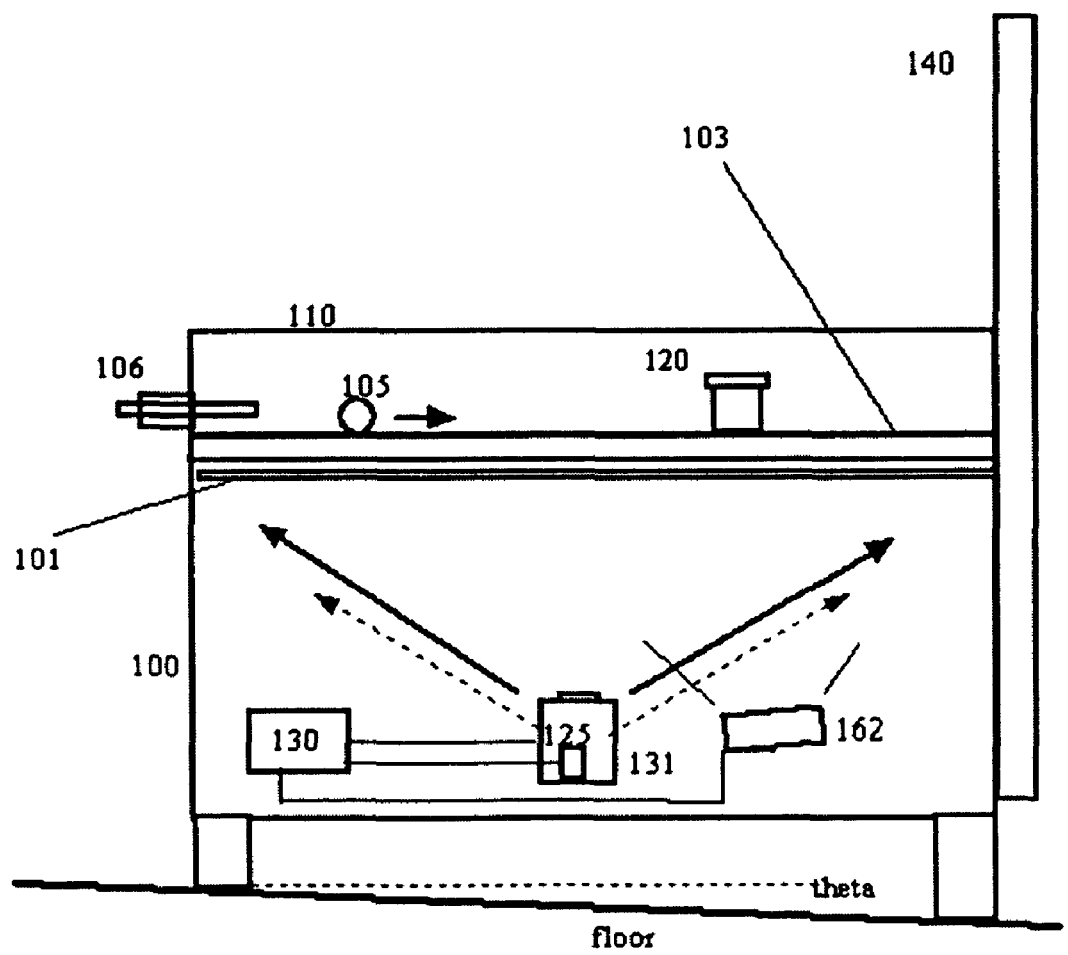

Pachinko Front View

Figure 3
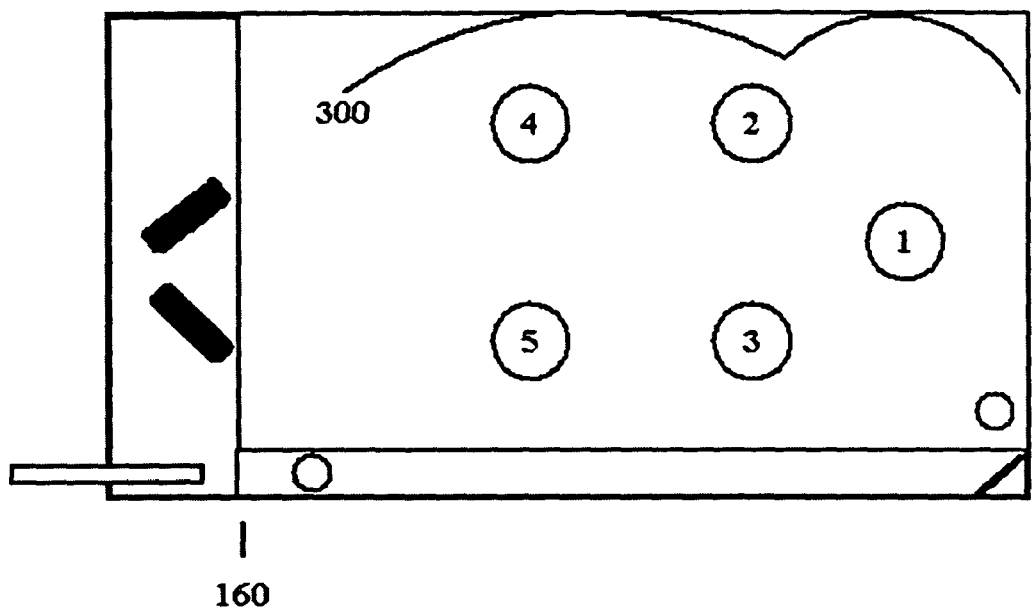
160
Figure 4 Shuffleboard
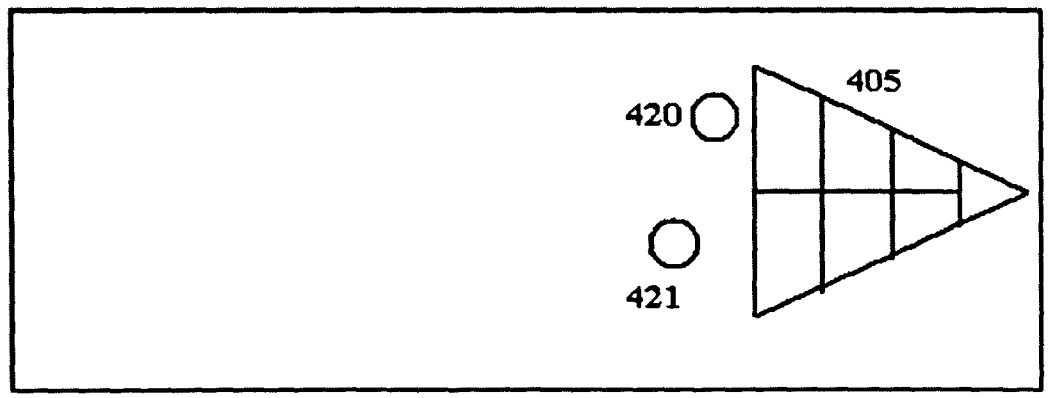

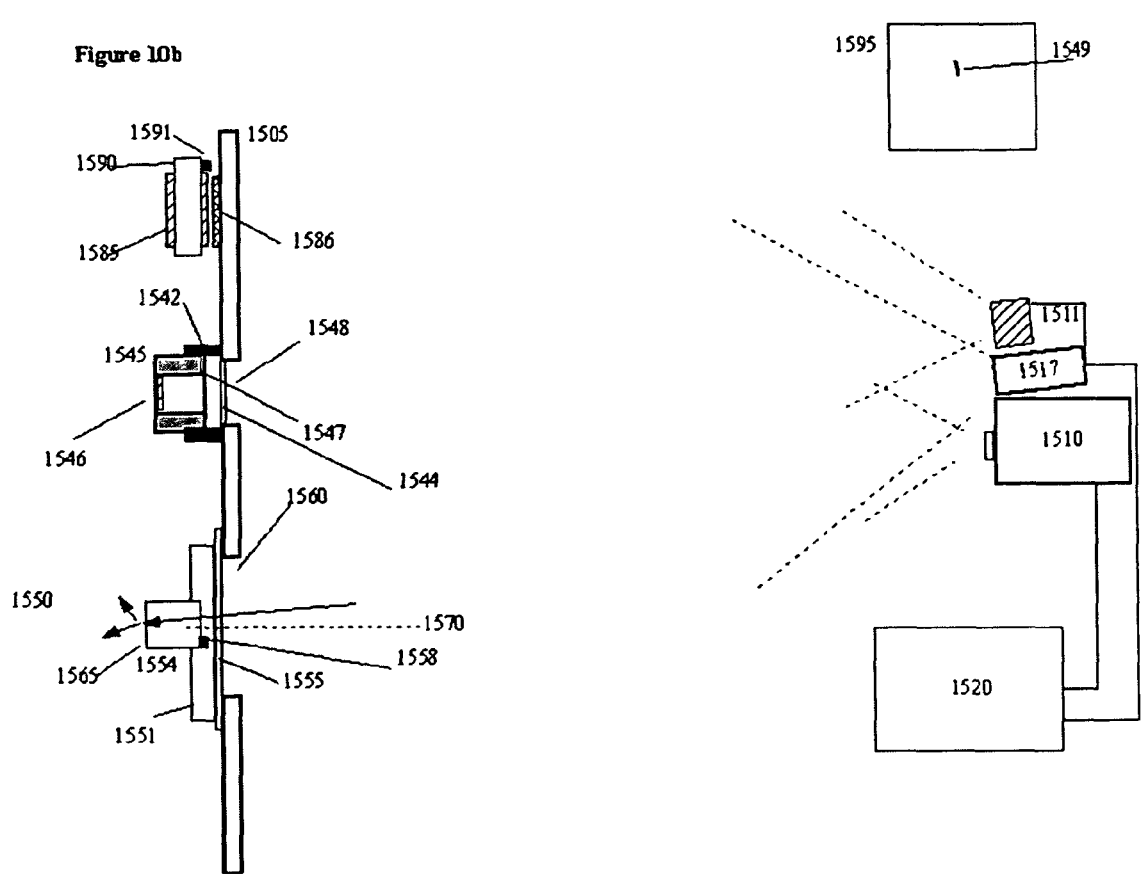

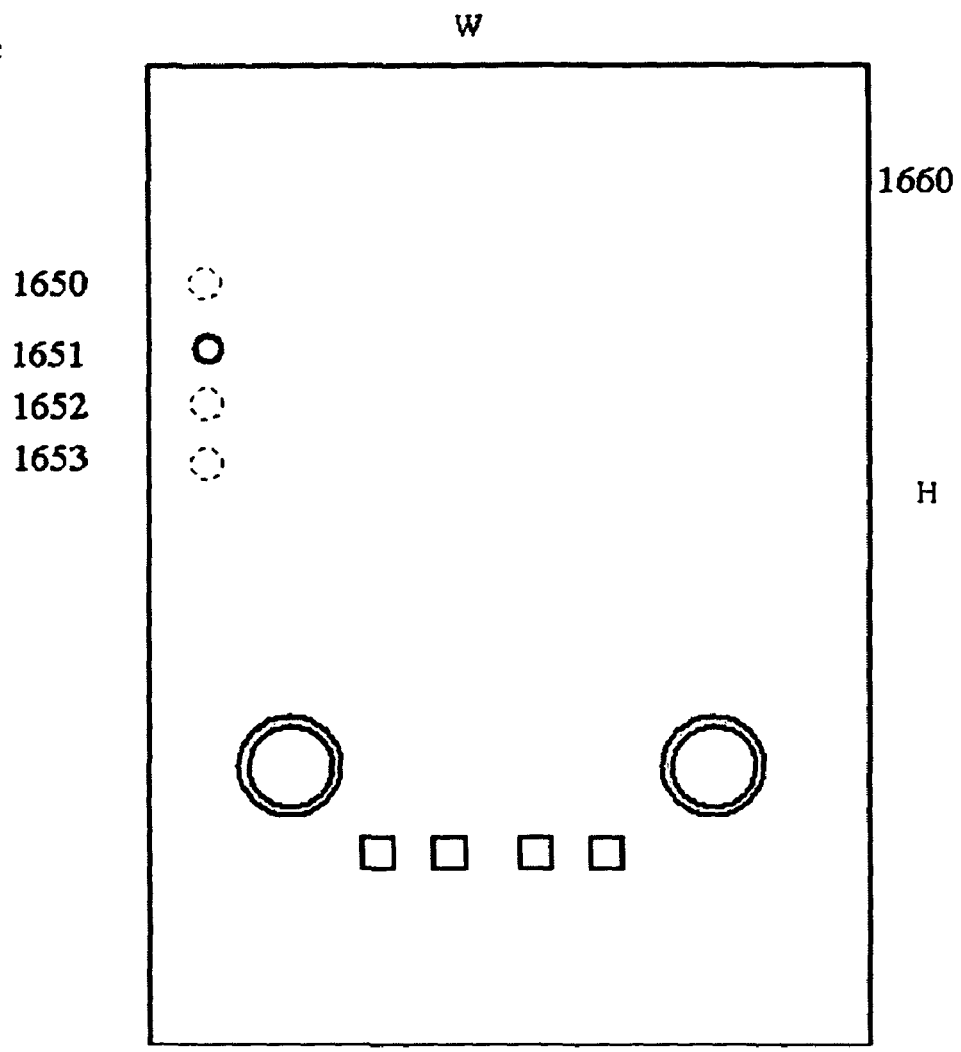

Figure 16
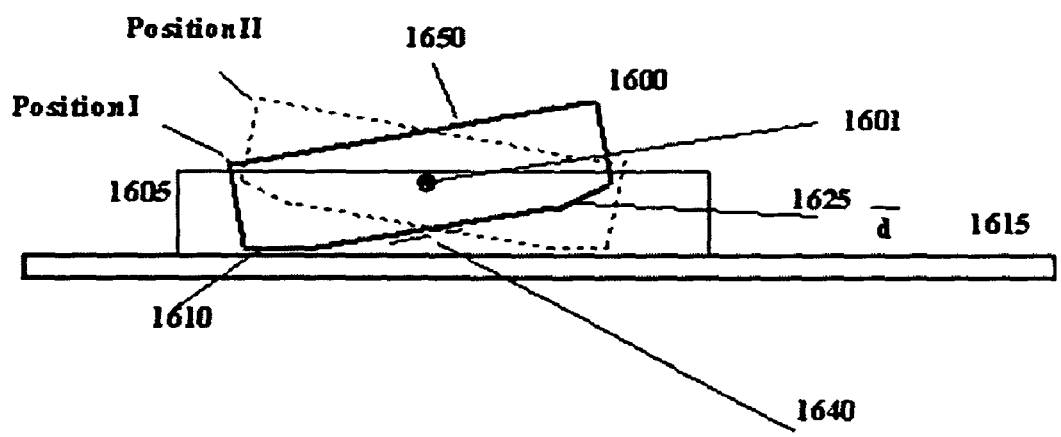
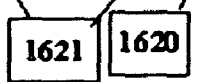
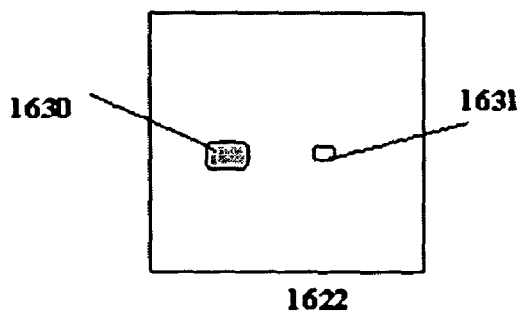

Figure 17
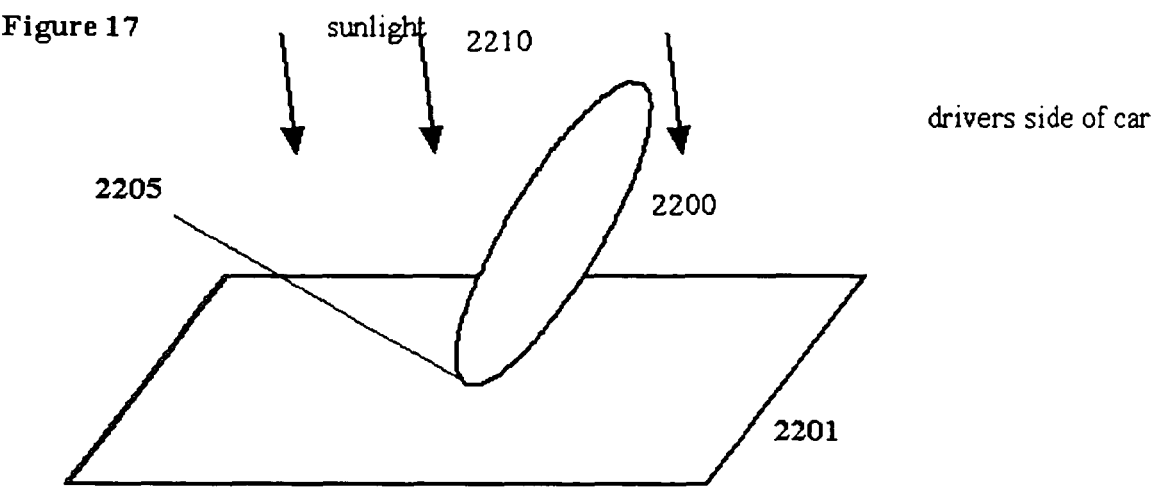
drivers side of car
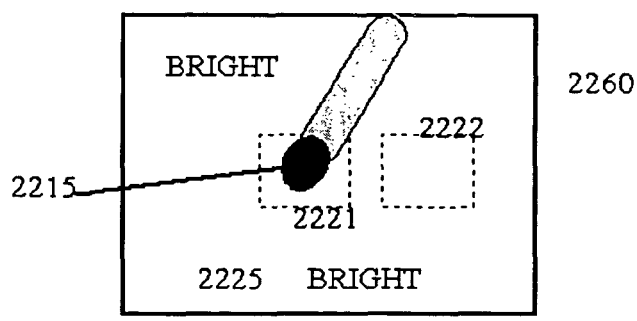

Figure 17b
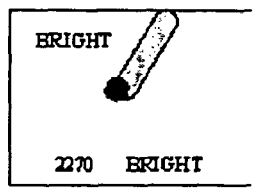
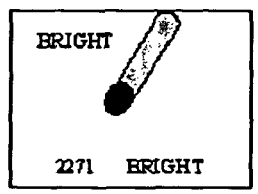
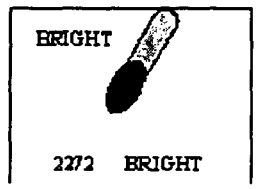
Figure 18
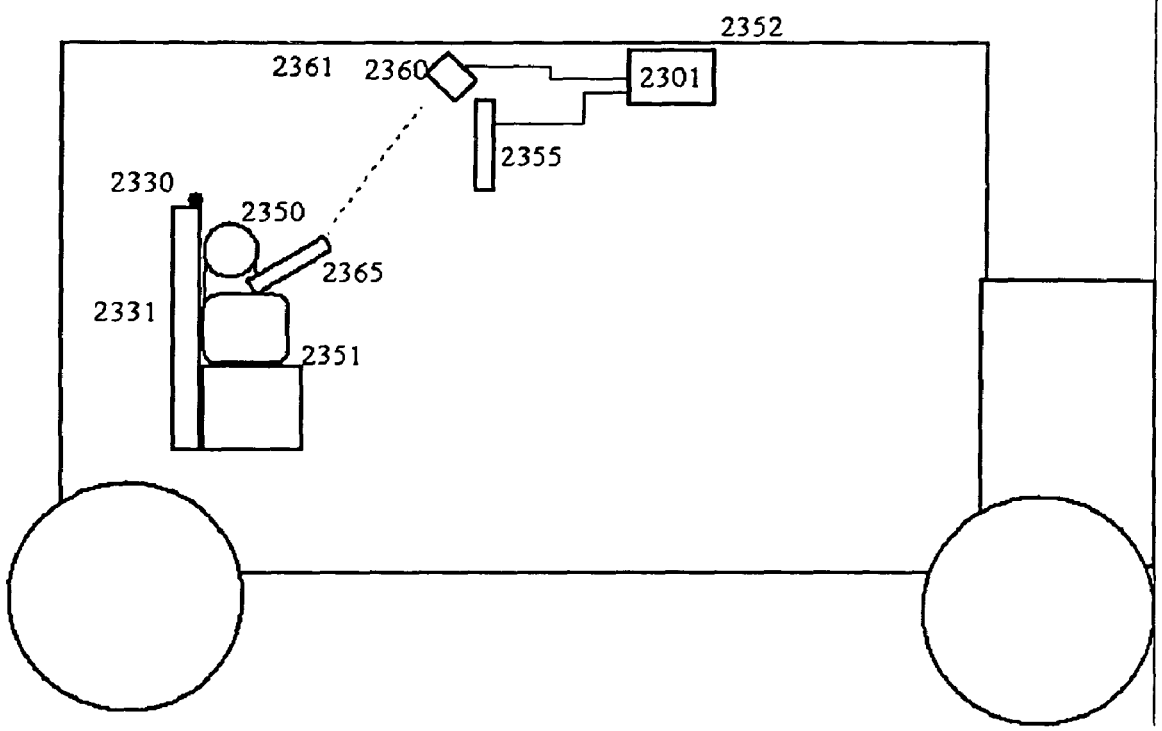

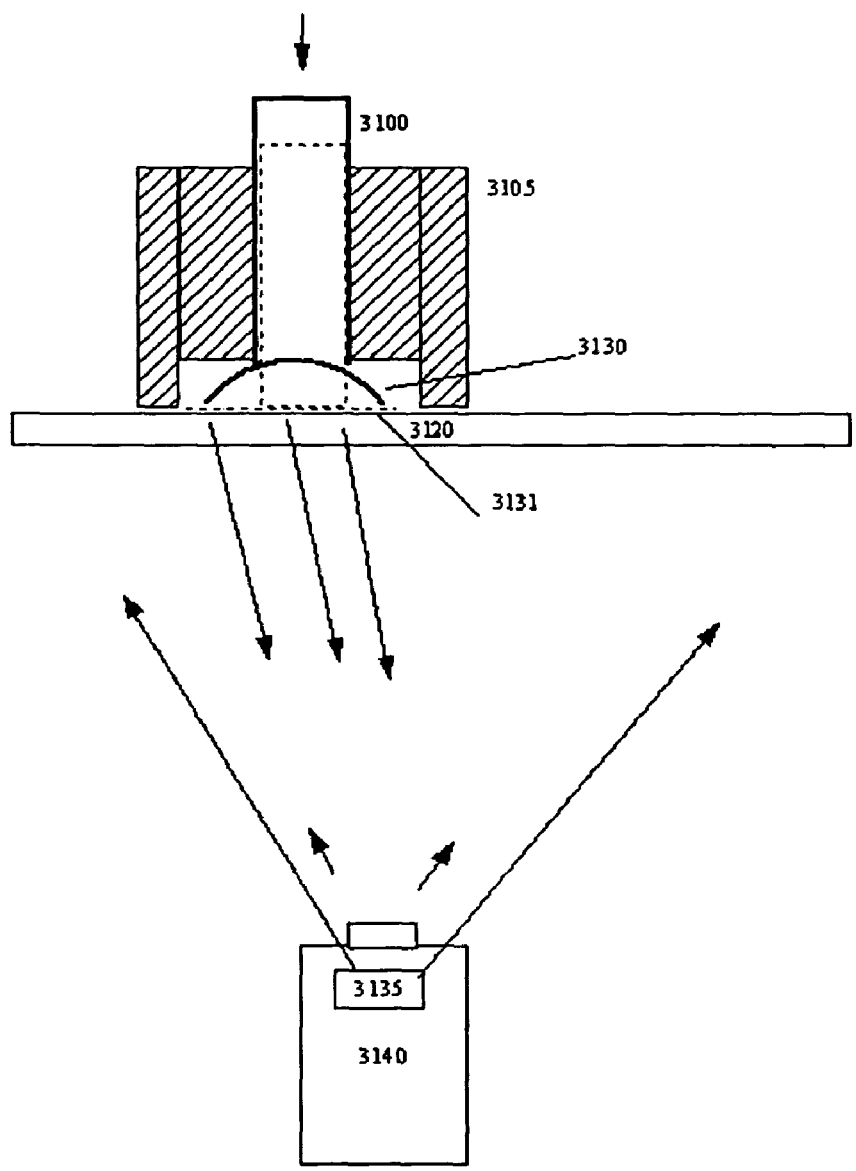
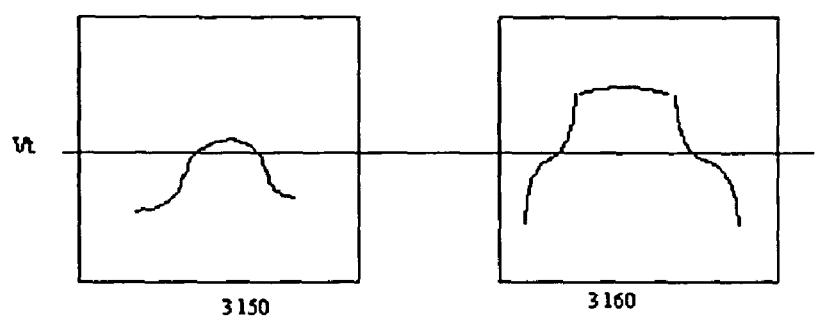
Figure 22

RECONFIGURABLE CONTROL DISPLAYS FOR GAMES, TOYS, AND OTHER APPLICATIONS

CROSS REFERENCE TO RELATED APPLICATIONS

This application claims benefit of U.S. Provisional Applications No. 60/499,890 filed Sep. 4, 2003 entitled "RTD Gaming"; 60/502,271 filed Sep. 12, 2003 entitled Reconfigurable Tactile Control Displays; and 60/539,578 filed Jan. 29, 2004 entitled Reconfigurable Tactile Control Displays For Automobile Instrument Panels and other Applications.

This application is a Continuation in Part of my applications PCT/US2004/09701 filed Mar. 31, 2004, entitled Reconfigurable Vehicle Instrument Panels; U.S. Ser. No. 10/611,814 filed Jul. 2, 2003 now U.S. Pat. No. 7,489,303; U.S. Ser. No. 09/789,538 filed Feb. 22, 2001, now U.S. Pat. No. 7,084,859 entitled Programmable Tactile touch Screen Displays and Man-Machine Interfaces for Improved Vehicle Instrumentation and Telematics; and U.S. Ser. No. 09/612,225 filed Jul. 7, 2000, now U.S. Pat. No. 6,766,036 entitled Camera Based Man Machine Interfaces.

CROSS REFERENCES TO RELATED APPLICATIONS BY THE INVENTOR

1. Touch TV and other Man Machine Interfaces (Ser. No. 09/435,854 which was a continuation of application Ser. No. 07/946,908, now U.S. Pat. No. 5,982,352);
2. Useful Man Machine interfaces and applications Ser. No. 09/138,339;
3. Ser. No. 09/789,538 entitled Programmable Tactile touch Screen Displays and Man machine Interfaces for Improved Vehicle Instrumentation and Telematics
4. Ser. No. 10/611,814 filed Jul. 2, 2003
5. PCT/US2004/09701 filed Mar. 31, 2004, entitled Reconfigurable Vehicle Instrument Panels
6. Ser. No. 09/612,225 entitled Camera Based Man Machine Interfaces The disclosures of the above patents and patent applications by the inventor are incorporated herein by reference:

FIELD OF THE INVENTION

The invention concerns affordable methods and apparatus for new forms of dynamically variable games and human interfaces for machine control using machine vision to determine the location or movement of objects and/or features of objects. Particular embodiments employing fast and reliable acquisition of game related objects and their motion tracking are disclosed, together with numerous applications, for example to games such as pinball and board games. Also disclosed are related embodiments for instrumentation and control system interfaces, such as those used in homes and automobiles.

BACKGROUND OF THE INVENTION

The background of the invention has been discussed in the co-pending patent applications relative to human interfaces for control systems and related applications. In terms of the use in games and toys as further disclosed herein, I know of no work similar to the instant invention, which discloses method and apparatus for creating dynamic and easily changed versions of classical games having a playing surface such as pinball and board games in which physical objects are moved by the player, in consideration of the physical attributes or displayed graphics on the playing surface on which the objects are moved.

SUMMARY OF THE INVENTION

My co-pending regular applications referenced above, and all incorporated by reference herein) describe a new form of interactive control display I call a Reconfigurable Tactile Control Display, or "RTD", for use in automobiles, homes and the like. In some preferred embodiments, a TV camera and associated image processing are used to determine both the rotational or xy position of various physical devices such as knobs, and/or the position in xy of a finger touch.

In practicing this invention I have also come to realize that it also can form the basis of a class of games, often played in horizontal or nearly horizontal table type form, but not necessarily. Games of this type, which may be constructed using the invention, include games such as pinball, pachinko, billiards, shuffleboard, racing, and board games. In these it is generally the position of a play object on a playing surface such as a ball or marker or car that is sensed by a machine vision system incorporating at least one TV camera. Alternatively, or in addition, the sensed variable can be the location of a finger touching the gaming surface. The complete programmability of the system including displayed data and graphics, and the physical interchangeability of the playing surface, make it possible to have many different games share the same structure, reducing the overall hardware and software cost per game accordingly. A projection display is preferred to accommodate different playing surfaces, often of significant size, and because of its compatibility with the use of machine vision cameras placed behind the screen on the projector side.

One typical example of a pinball game uses a commercially available rear projection TV turned so its screen is nearly horizontal and uses the machine vision camera of the invention, placed inside the TV set and viewing the region of the screen from the rear, to track a ball rolling on the TV screen or an overlaid playing surface placed upon it.

The projection TV device allows dynamically varying graphics and other activity to be generated in order to create the image seen by the user on the playing surface. This allows one to change the character of the whole game by changing not only the projection display and machine vision image analysis software characteristic of the game in question, but also, if desired, the physical nature of the front playing surface (either an overlay in front of the TV screen or provided on it), on which various bumpers, pins, and other mechanical details might be attached. Other playing surfaces could have grooves or ridges provided thereon, or different elevations on a larger scale such as hills and valleys.

Further disclosed herein are gaming machines and other games which other utilize unique features of the RTD such as its ability to have mechanical devices protrude through the screen on which game related information is displayed, and the ability to determine location of finger touch on the play or display surface which can for example be used to interact with stored or live TV camera images.

In one embodiment, the game also serves as a conventional TV set when facing appropriately and with physical game structure removed from at least the TV viewing region of interest. This too allows the cost (and space requirements) of the device to be shared over multiple uses. For example in the family room of a home, it can be both a TV and, at another time, a game.

Another form of game (or other activity) is also disclosed in which a hand, head or other object portion of a player in the game is sensed in its 3D position and generally orientation as well, and a graphical depiction of the object part sensed is displayed on the display, such as an HDTV projection TV. This depicted portion, then may interact with graphically depicted characters on the screen, through the players action of the sensed portion of the player.

The invention herein also discloses further embodiments useful in controls and instrumentation such as automobile instrument panels. New forms of physical control details such as knobs sliders and switches are disclosed which enable reliable operation with TV cameras, and which allow display of projected data on the face of the detail, by modifying the construction of a rear projection screen in the location of the detail. In the switches disclosed, a z-axis motion into the screen is reliably converted using novel methods into a change in width or location of one or more imaged datum's seen by the TV camera (whose image field is typically in x and y). Other embodiments include cost effective method for providing enhanced control functions on low cost cars having mechanical control actuations for HVAC functions. New methods for detection of finger touch using machine vision in these or other systems are also disclosed.

THE INVENTION IS ILLUSTRATED IN THE FOLLOWING FIGURES

FIG. 1 illustrates a pinball game of the invention having a computer controlled, rear projection display programmable in its function as a result of machine vision based sensing of the ball shot by the player;

FIG. 3 illustrates an interchangeable playing surface suitable for use in a pinball game;

FIG. 4 illustrates a shuffleboard game of the invention;

FIG. 7 also illustrates the alternative (and convertible) use of the game device as a home TV or entertainment system;

FIG. 16 illustrates machine vision sensing of physical control details, including rocker switches;

FIG. 17 illustrates methods of machine vision sensing of finger touch;

FIG. 18 illustrates gesture and position based inputs for control of entertainment devices in the rear seat of a minivan;

FIG. 22 illustrates a pushbutton switch according to the invention; and

THE INVENTION IS DESCRIBED IN THE FOLLOWING EMBODIMENTS

Figure 2:
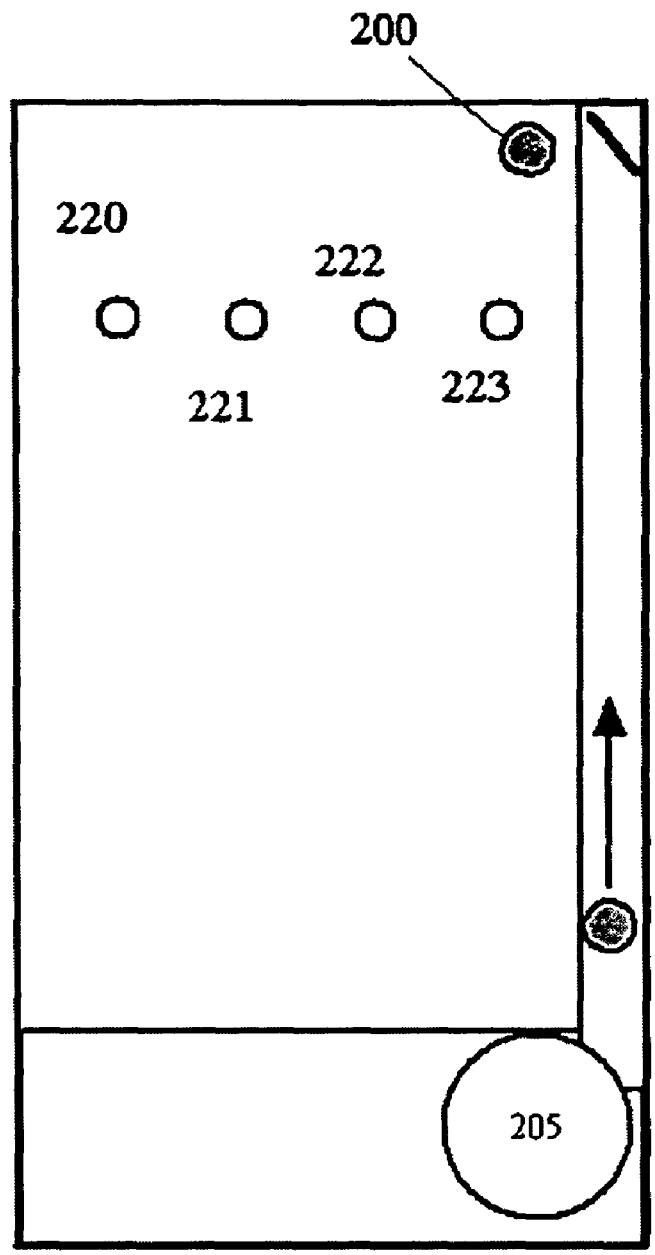
FIG. 2 illustrates a pachinko game of the invention, similar to that of FIG. 1 but vertical in its orientation characteristic of pachinko.

FIG. 1 illustrates a representative pinball embodiment having the basic components of rear projection video image display, in this case provided by a Samsung 61 inch diagonal HDTV (16×9 aspect ratio) DLP rear projection HDTV set, 100, turned with its screen face up as shown, in this case also making a slight angle theta to the horizontal typical of pinball games.

For example, the ball 105 at time t1 shot by retracting plunger 106 rolls around the top of the pinball enclosure 110 (on top of the screen 101 of TV set 100) and at time t2 hits a bumper 120 characteristic of the game. In this case the camera image obtained by camera 125 observing the area of playing surface 103 on top of the screen of the TV set 101 contains the position of the ball in the xy plane of the playing surface, as well as any other objects on the surface such as bumper 120. When computer 130 it can be analyzed and determined that the ball has hit bumper 120, and on subsequent image frames its new rebounding location determined processes this image.

The data that bumper 120 has been hit is then used by computer 130 to control one or more game parameters, for example to drive the DLP projector 131 of the TV set to display new graphics from the computer including a display of a flashing bumper hit, for example by varying the illumination of the bumper, the words on or near the bumper or indications as desired. A scoreboard type game parameter may be displayed on the playing surface by the projector, or on a separate board typical of pinball games such as 140. The scoreboard can also be suitably changed to indicate the event, for example adding 100 points to the score when the bumper is hit.

The game of Pinball comprehends that the ball may hit multiple bumpers or sidewalls or other objects. Its path, its position, and new path and what it hit can all be sensed using the camera and computer system of the invention and similarly acted on for scoring, projection or other purposes.

When the ball 105 hits at a further time t3 a flipper 150 near the bottom of the game surface, the player may activate a button energizing a solenoid to flip the flipper as is well known in pinball machine play, in order to send the ball back toward the top and replay it, hoping to hit more scoring locations. These locations may be bumper hits, side hits, or just passing over a certain projected symbol such as bulls eye 155 shown, which game parameter might only be projected on to the screen for a short period of play if desired. The camera computer system can detect the presence of the ball in any or all of these locations as disclosed herein and in copending applications. The computer system synchronizes the projection and sensing functions as needed, together with any audio information, such as from a Wav file in the computer, such as a cheer for making a score.

In another aspect of play, the ball may fall down and be recovered, such as ball 106 which has just fallen thru hole 107 and is caught by trap 108 out of the path of projected light to the display surface. The screen design allows one to insert a solenoid in a hole that a ball falls into, in order to eject it back to the playing surface if desired. In some cases it may be desired to use a fresnel lens to collimate the projected image.

When all balls (usually 5) have been played, the game is ended and the total score tallied by the computer and the results displayed as desired.

Such a system is totally programmable in terms of all projected data, and the meaning given sensed locations and paths of the ball in the video image processing system and the control of any game parameters using this data. A suitable processing program is the Matrox (Montreal, Quebec) MIL image processing library, version 7.0 resident in a Pentium 4 based PC operating at 3 GHZ. A suitable camera is a Vitana (Ottawa Ontario) progressive scan firewire type, which may be digitally interfaced to the same computer. In processing the image it is generally desirable to scan the camera array substantially only where expected ball positions are, in order to speed up scan time. Pixel addressing types of cameras like the Fuga 1000 (from fill factory in Belgium) for example can allow even individual addressing of pixels, as opposed to windows of pixels, and are even better for tracking of the balls motion.

It is also of interest to note that the game surface including the physical location of bumpers and sideways and the like can be completely changed at little cost. One might for example leave the flippers (and their associated mounts and guide rails conveying a missed ball into the ball deposit hole) always in place at the bottom as shown, but change out everything from line 160 forward, to create different game versions. This is done simply by replacing the playing surface member and the physical items thereon. Since there is no need for electrical connections to the bumpers or other physical items, this makes the interchange very inexpensive, with software being the main difference between the games—itself costing little. The games however, may be totally different in their play, due to the changed physical locations and projected data and interaction program.

When operating in reflection, where light reflected from the ball and objects like bumpers is detected, the Projector source itself can provide the illumination. Alternatively, The light source can be an Infra red source (e.g. a LED array 162 operating at a wavelength 880 nm) and located with the TV camera which may incorporate a band pass filter in front of the camera lens (obtainable from Edmund Optical co in Barrington, NJ but not shown for clarity) if desired to see substantially only light at this wavelength. Typically, the source 162 is controlled by the computer to operate in concert with the TV camera. As a further alternate, front lighting from overhead sources can be provided, such that the objects such as the ball, bumper sidewalls and flippers are detected by backlighting thereof (providing a shadow image). Here too it can be desirable to operate in the infrared to not disturb play. A possible problem here is that the player in some game modes may obscure the overhead lighting at some point.

It should be noted that the device of FIG. 1 could be hand held, as the display and camera and computer technology is such that the whole thing can be miniaturized. In this case a player might hold the pinball table in two hands and move it in order to cause a ball to roll this way or that, with the projection scoring and other features adjusted as described above.

Note that due to the non-contact nature of the operation of this unique pinball game, the projector and/or camera can be fixed while the game table was tilted or translated by the player. The machine vision system can sense the new orientation or location and adjust via the computer, the projection system and the displayed graphics accordingly.

FIG. 2 illustrates a similar arrangement for Pachinko—a form of pinball played primarily in Japan that typically, as I understand it, has no flippers (but could have such player activated mechanisms if desired). In this case the ball such as 200 is shot vertically by the player turning a knob such as 205 and releasing it. The ball then after reaching the top falls down through pins, with the manner in which they fall determining the score. Pins 220-223 are indicative of the many pins, which typically protrude form the playing and display surface.

In the instant invention, it is preferable that the balls fall through the cascade of pins in a constrained manner between an outer glass plate and the front of the projection screen on the inside, so the player can see them falling in front of the displayed graphics, but the balls don't fall out. Pin ball tables typically have glass tops too. As in the pinball case, the motion of the balls can be tracked by a computer and camera based machine vision system, and various scoring possibilities and display possibilities engaged, which can make the game more interesting for the players. Note that the pins can be transparent plastic, which like the bumpers in FIG. 1, can have data projected through them, typically to a scattering surface on their outer face, such as some knobs of FIG. 10 employ.

The ball in this Pachinko example of the invention is not necessarily against the portion of the projection surface in its fall, but if it is not too distant, it can be seen adequately by the vision system through the screen. This is particularly true for less diffusive screens, and it is noted that wide diffusion such as provided by 3M vikuiti screens with minute glass bead scatterers is not required here, since the player is typically directly in front of the screen. In the pinball case, he is off at an angle to at least a portion of the surface and there may be onlookers who need to see as well. The unshaded playing and display surface portion is easily interchangeable along with different game software.

FIG. 3 illustrates an alternative playing surface, which may be substituted for that of FIG. 1. In this case it is assumed the flippers remain in place and that this surface replaces that from 160 upwards. Note however, that the flippers could be changed as well if desired. The non-shaded portion is interchanged along with the requisite software (projection display and camera image analysis) to match. This version has 5 bumpers (labeled 1-5) and a different sidewall guide.

It should be noted that my copending US application Camera Based Man Machine Interfaces Ser. No. 09/612,225, incorporated herein by reference, discloses board games and other games in which a camera overhead is used to see markers and play. It also discloses advantageous pixel addressing camera arrangements for object tracking. The use of the camera overhead allows more freedom in design of the playing surface (which doesn't have to be light transmitting), and allows the human to be sensed with the camera as well. A projection device such as the DLP projector disclosed herein can be used to project play information desired too. However package does not lend itself to a self contained machine, and there is the possibility of human obscuration in play.

FIG. 4 illustrates a similar surface for a shuffleboard game 400. The markings on the shuffleboard surface 405 can be the same each time, or changed in the projector. In this case the shuffleboard pucks such as 420 and 421 are all sensed with the camera including their relative locations to the scoring positions in the typical triangle shaped arrangement on the projected board. The surface of the shuffleboard device however, to operate using the invention needs to transmit the projected light, and this limits the use of wood boarding as is often the case with shuffleboard. For this reason shuffleboard might best be played with the method of Ser. No. 09/612,225, though a projector like disclosed herein could be used to project data on the play surface from above. Other table games could be done this way as well, however. Also one can build a game in which the infra red sensing from below is used as disclosed herein, operating thru a playing surface that transmits Infrared but not visible. In this case projection would be from the top, or a playing surface with printed on labels and data could be used.

Just as shuffleboard comprehends the determination of the location of multiple pucks using the video camera of the invention, so may one see multiple balls at once, even in motion, for example in the pinball or pachinko games above. This allows a very dynamic game for a player, playing two balls at once for example in pinball.

Figure 5:
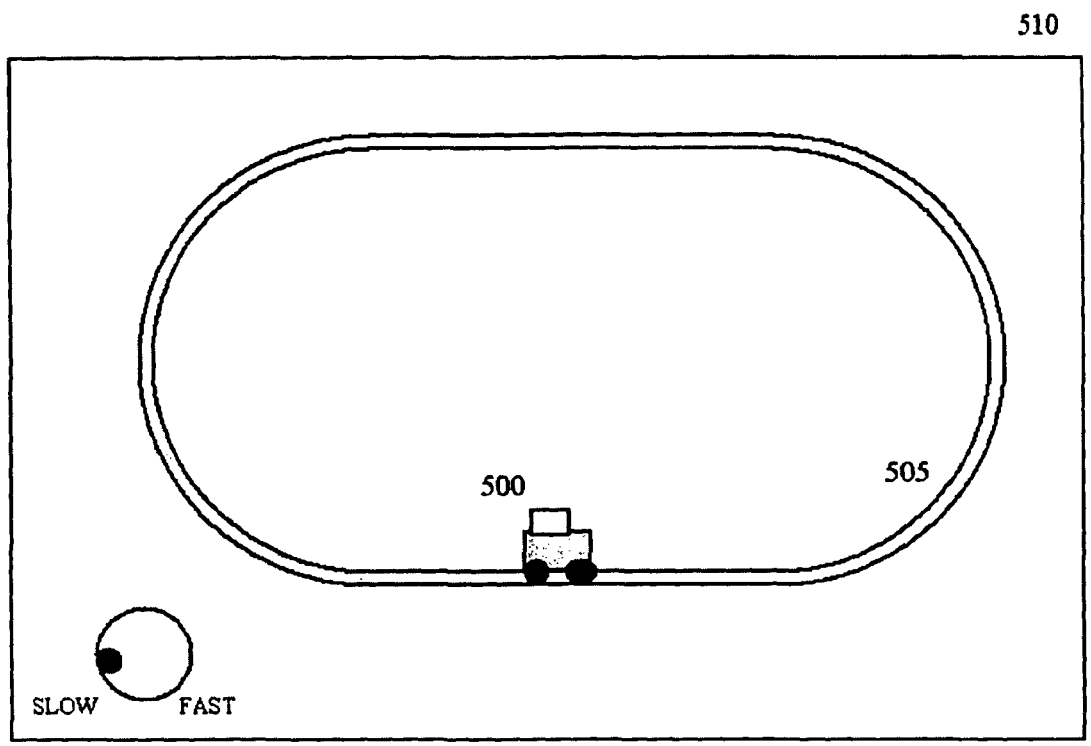
FIG. 5 illustrates a toy racecar game of the invention. In this example the play object (a car) runs in a track or lane on the playing surface.

FIG. 5 illustrates a racing car game of the invention. In this example, at least one play object, such as a toy car 500, runs in a track or lane 505, (or tracks plural, such as parallel tracks) on the playing surface 510. This lane can be a groove in the surface or a rail or rails extending above the surface, for example. Once again the TV camera of the system detects its location, and change in location indicative of speed if desired, and controls the projection and scoring. The car is controlled by means of known electrical or radio controls. If electrical current to the track is required, the means to do this can be added to the playing surface.

It is noted that the game can also be played where there is no fixed track, using the machine vision system to detect the position in xy of the car anywhere in the playing surface, like the pinball of FIG. 1 (noting that the vision system in this case can optionally also detect the pointing direction of the car and thus the path it will follow in the future). This is useful with radio controlled cars for example. And like the shuffleboard example, it may be useful to project information from above the surface, as well as locate the camera above the surface, if the surface is opaque, such as a dirt track.

By using a surface on which information can be displayed from the rear, it is possible to nicely project for example on the surface an turn in a road, or a new route, which could be constantly varied depending on the position of the cars.

Figure 6:
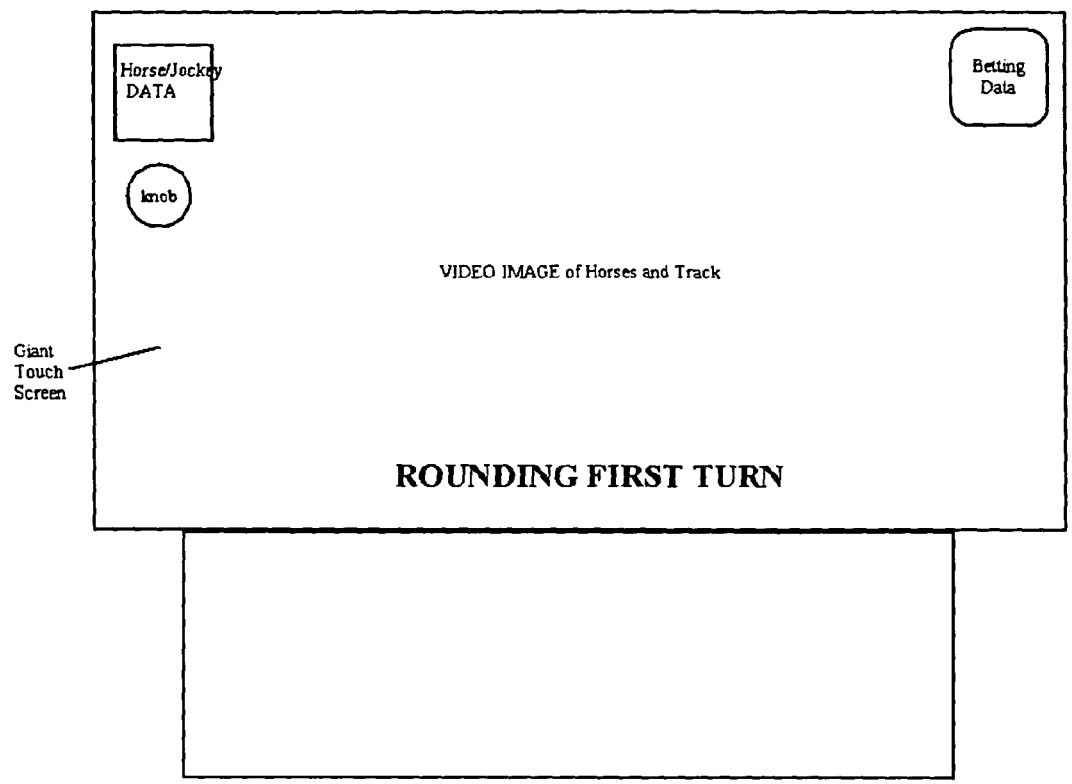
FIG. 6 illustrates a horse racing game of the invention using information from stored or live race TV camera images, which can be used to determine new betting regimes or for pure amusement.

FIG. 6 illustrates a horse racing game of the invention. One version could be similar to the car above, with horses instead of cars. For example, it can be a model horse electrically driven with wheels, magnetically, or whatever and radio controlled for example. Power can be by battery, or provided inductively since the playing surface can contain inductive power transfer tracks, coils or other devices without interrupting the projection or sensing. (such devices can also be used to change the path or speed of pin balls for example as well, or of stones in a simulated curling game like shuffleboard)

Alternatively, the track may be virtual, instead of physical, which is to say in visually projected image form. In this case the player of a horse moves a control connected to the computer controlling the projector to cause the horse to follow the track at a desired speed, also in consideration of other horses, actual horse capability data, horse performance statistics, jockey information, track information, or the like. And in yet another form, the horse(s) too can be virtual and their images projected.

Illustrated is a quite different version, which in this example is used for betting. The horse's images 600 and 601 displayed by the projector (not shown) on the game screen 605, can be video images of real horses running in a race, provided by a remote camera either in real time (for example at an actual race track) or via stored video imagery from computer and data storage 620 connected to the projector.

The use of data from a race in real time, allows a new form of dynamic betting during the running of the race to occur. In this case, the player can place a bet during the race on a given horse (or horses) running the race by for example touching its image on the screen, using his finger 630 to touch the horse image 600. (though it is recognized that other forms of bet placing can be done such as touching a projected icon box on the screen rather than the horse itself). Data, such as 650 about the race can also be projected, and the odds can (and likely will) change as the race gets further along toward the finish, since near the finish the winner and relative placement of the horses becomes more obvious. This betting can be done at the track, or anywhere data can be transmitted to the system of the invention.

If one is to touch the horse itself on the screen to bet (as opposed, for example, to an icon box with the horses name or number on it), it is necessary for the system to identify the horse. The video processor of the invention, or a processor at the track at the point of data acquisition can be used by known means to determine from the horses numbers or other codes which horse image on the screen is which.

The user can also use the touch capability of the screen of the invention to touch some of the data as desired, or specialized icon boxes that could be projected such as bets allowed, or whatever.

Some of this type of activity can be done using conventional video monitors and conventional touch screens, but there is an advantage I believe in having a big screen so that individual horses are easily seen and interacted with. Rear projection easily provides this and the RTD invention is economical. Since it can provide physical controls such as knob on the screen as desired, and an interactive touch data entry capability, at modest extra cost over the basic projection TV itself.

Camera imagery projected on the screen can also be provided from the horse's viewpoint if desired, for example with tiny battery powered cameras and transmitters on the horse or the jockey as an example.

The unit is shown in the figure as vertical (as if one was looking out a window from the grandstand at the track), but could be in another plane.

Figure 7:
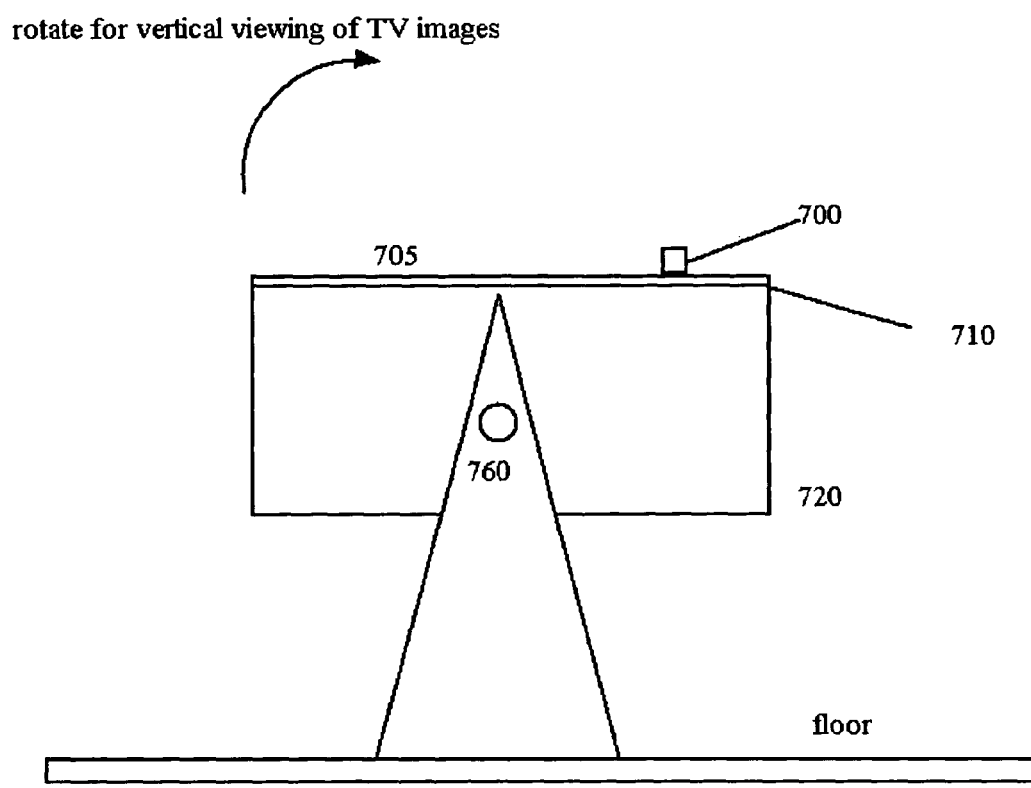
FIG. 7 illustrates a board game of the invention, programmable to accommodate a large number of different common games such as monopoly, scrabble, checkers, and variations thereof.

FIG. 7 illustrates a board game of the invention, which can have physical pieces such as 700 moved by a player on a projected game board on board surface 705 on top of TV screen 710 of projection TV 720, including within its housing the TV Camera, computer and Projector of the invention as disclosed above. In this case too, the machine vision system determines the location of the piece 700 also in relation to the projected information and other pieces, including pieces that are stationary. For example, the camera and associated machine vision processor in a projected monopoly game can determine the location of each person's player (and whose it is by its shape or color) and the location of the number of houses or other thing s placed on the various properties in the projected locations around the square of the board, which in turn is imaged by the TV camera whose data is processed by the machine vision software used.

The projection TV can be based on the Samsung DLP chip based one mentioned above. However since Monopoly and many other board games have a square board, a projection TV with a more square aspect ratio such as the historic 4×3 aspect ratio would be better suited than the aforementioned HDTV ratio of 16:9. (with the latter, a significant part is unused, though it can be used to show other data such as, in monopoly, pictures of the real estate properties to be purchased or sold. In a Clue game, it could show still or moving pictures of the suspects, for example gaming data and relative scores could be projected in the spare space, as could game instructions when needed. And so on. Special square TVs can also be built with video projectors and square screens if desired.

Using the invention this monopoly game can be changed using only software, into virtually any other board game desired. The player's pieces can even be chosen arbitrarily and taught to the system, in order to set a game parameter of that player. For example one player might use a quarter, and the other a dime. The camera and computer would determine the large diameter piece belonged to player 1 and the smaller to player 2, as each put their piece down in succession.

One can also easily create ones own board games for such a system by generating desired graphics using for example a CAD system, and making up rules and other game parameters for pieces and their locations which can be associated with video camera image data.

Finally, one can when not playing games, just use it as a TV set or home entertainment system, for example by removing the play surface if necessary (for example if the playing surface was not sufficiently transparent or had objects attached to it) and just having a swing mechanism such as 760 to swing the unit to the horizontal or any other angle for best viewing.

Figure 8:
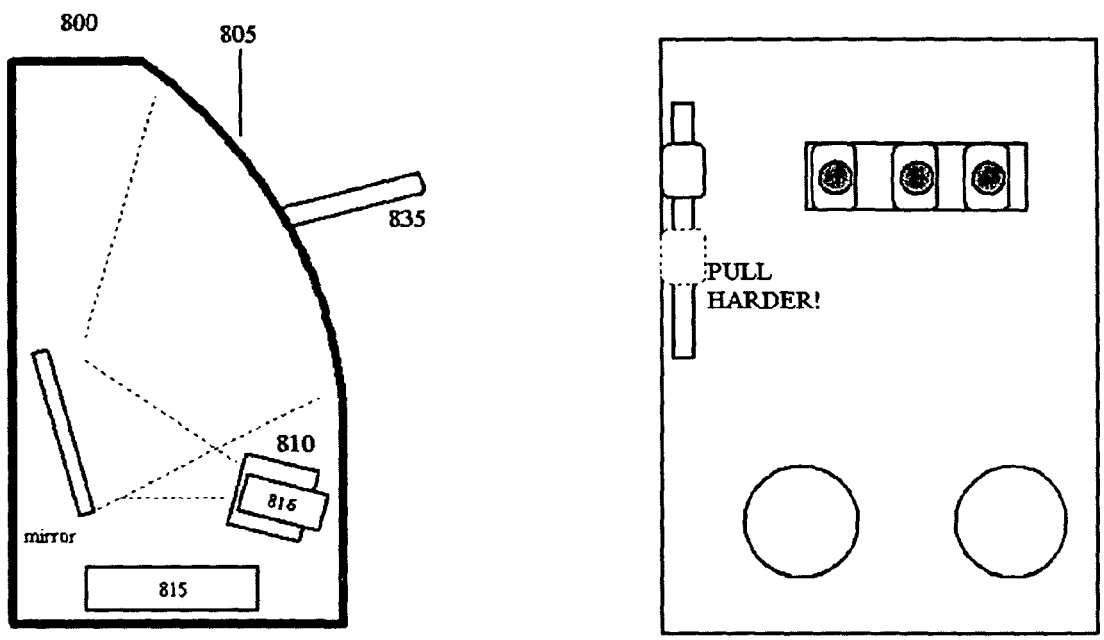
FIG. 8 illustrates a curved screen slot machine of the invention with a mechanical handle through the screen and a projected response to handle movement.

FIG. 8 illustrates a curved screen slot machine of the invention.

As noted in the co-pending applications the screen of the invention does not have to be flat, and indeed for automobile use is often curved. A Video projector source can easily project on a curved screen, with appropriate optics.

In one example, a slot machine 800 is here illustrated which for example has a curved screen 805, though it too could have a flat screen as shown in the embodiments above. The curved screen in this case is for stylistic effect, and differentiates the device from other flat screen video games. A video projector 810 illuminates the screen from the rear using computer control 815 including a memory where the stored graphics desired are located. Alternatively such information can be downloaded from remote sources. As in the above cases a TV camera 816 observes things occurring on the screen or objects associated with it and communicates this image information to the processing program in computer 815. A suitable program could be the Matrox (Montreal, Quebec) MIL image processing library, version 7.0

Another differentiator is a mechanical lever handle 830 through a cut out in the screen, which is pulled by the user in order to start the video simulated wheels moving (in a classical three rotating dial slot machine arrangement). This handle could have been on the outside of the housing holding the components but is here shown as going through a slot 835 in the screen 805. This arrangement allows data to be displayed directly adjacent the handle. For example, the handle position and its speed and acceleration may be detected by successive observation of a point on the handle by camera and in so doing, the projector dynamically changed to present such data, for example telling the user some piece of related information. For example, when the handle is in position 835' in its travel, (dotted lines) the words "PULL HARDER" might be projected. This can be used to add a bit more "Skill" into how the handle is pulled, turning if desired the game into not just a game of luck Oust as pachinko has a small bit of skill involved in how the ball is shot—note that such dynamics can be added to pachinko too, by using the camera to monitor the shooting knob or something connected with it).

The slot in which the lever handle travels may alternatively not be fully surrounded by the screen. The ability of the RTD invention projection display screen in general to be irregular in shape, or have cutouts in it, and to be curved as desired, tends to help separate such a game from the run of the mill video gaming device.

The RTD can also sense touch it is possible to project touch icons onto the screen and let the player touch these for some purpose, for example, to select a handle pulling regime. Or to ask the machine for a further bet if a certain situation arises in the rotating wheel (or other such) win information results. The RTD may also allow physical control details such as knobs 850 or 851 to be turned to affect play.

Where a scanning projector is used, this device may also be used, as disclosed in co-pending applications, to sense as well, obviating the necessity for as separate camera.

Because the camera and computer can discern colors as well as shapes, and other geometric variables, one can have different colored balls if desired all sensed independently. This can allow multi-user games, which historically might have been, like pinball, suitable only for one.

It should be noted that more than one TV camera can be used to detect positions, velocities, accelerations or events on the playing surface of the invention. Use of multiple cameras allows more resolution, different vantage points or angulations for lighting advantage, or other possibilities. The cameras can also observe the same field of view but for different reasons. For example, one camera can be looking at the whole field, while another (such as a pixel addressing type) is used for high speed tracking of an object in the field.

In the above discussion x and y are generally the axes of the playing surface which also correspond to the camera image. Z is the dimension in the direction normal to the surface.

In the sense of its use of a machine vision system to sense game activity, it is both similar to the disclosure of some of my other copending applications. And some of the teachings herein can be used in those embodiments as well While it is considered that most projected display data and/or gaming instructions for the computer and vision system would be stored locally (e.g. on DVD), it also comprehended that such could be downloaded from remote sources.

It should be noted in the above examples that optional cameras may be used to sense the player himself, or an object in his hand or other object, such as taught in my invention U.S. Pat. No. 5,982,352, and other copending applications. And this data, for example hand or head position or movement direction, or pointing direction, can be coordinated to influence the data projected. The machine vision processor of the apparatus can in many cases handle the data from each camera, allowing an economy of scale.

Figure 9:
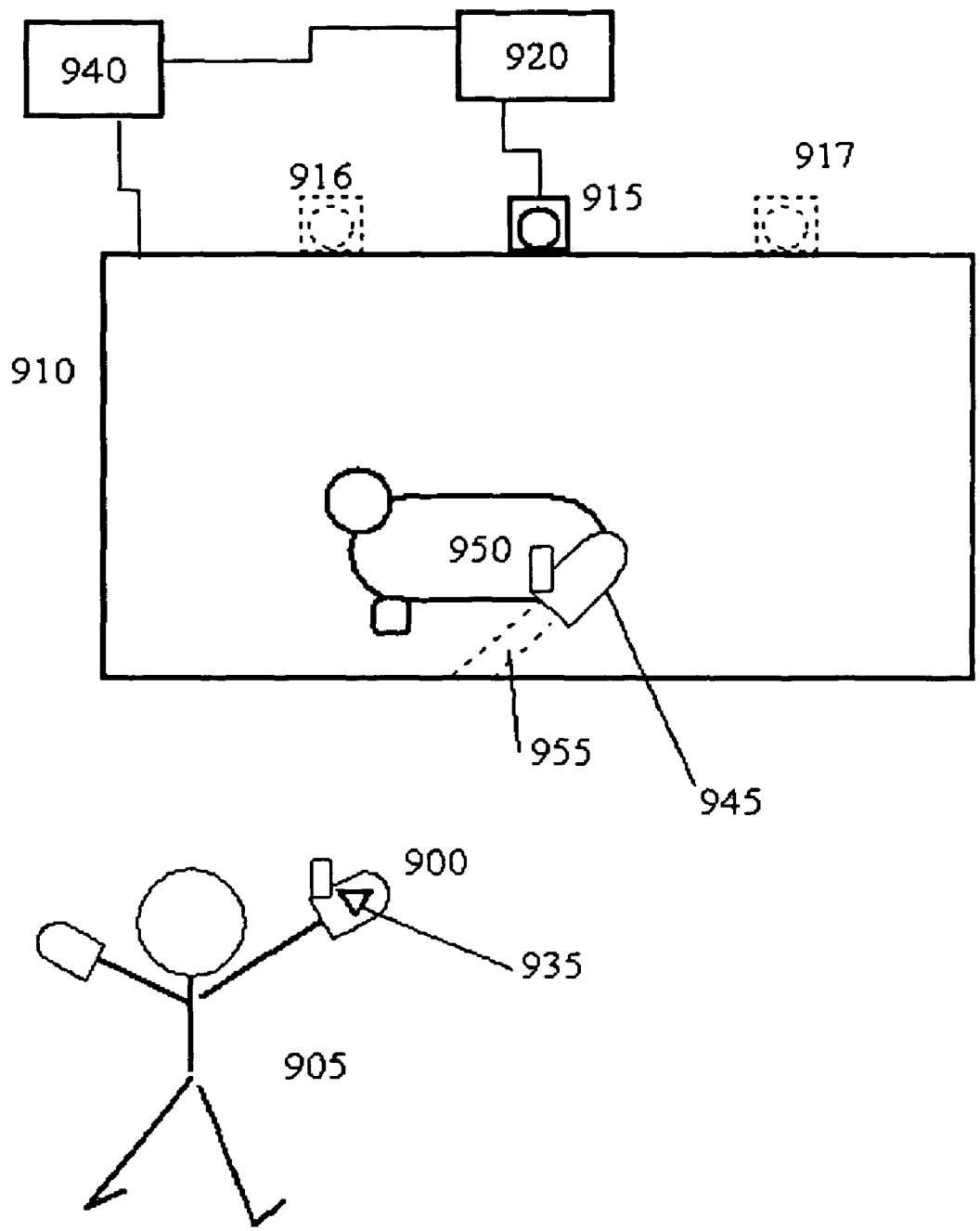
FIG. 9 illustrates a camera based game with a portion of the user sensed by a camera system depicted on the screen, either in a 3D representation using computer generated graphics, or video clips called from memory.

FIG. 9 carries this thought another step in a manner related to some of my previous inventions, and depicts is a camera based game with three dimensional graphics, in which a portion of a player, in this case hand 900 of the player 905 is depicted on the screen 910. The hand is sensed by one or more TV cameras 915 and data processed by computer 920 having machine vision software such as the Matrox Mil 7.2 library. In the example shown, the users hand in this case may have an artificial datum set 935 of three distinct high contrast targets (in this case depicted as the apexes of the triangle, but which could be for example circular dots as shown in many of my cases) which allows the camera to rapidly acquire accurate data in several degrees of freedom, usually 5 and often 6. This in turn allows the computer graphics processor 940 to display on the screen 91 0 a graphical representation 945 of the detected player portion in this case a hand, and its detected interaction with a displayed object on the screen, in this case a cat, 950 As the graphically depicted hand 945 strokes the cat in a manner following the motion of the players real hand 900 using the invention, the cat image can be programmed in the computer 920 to make appropriate movements with accompanying sounds from the computer's speaker system via Wav files or the like called up from memory.

Because the system has been instructed that it is tracking your hand, and your position can be entered with respect tot the computer display screen, one can also predict the location and orientation of and computer generate in processor 940, life like associated images for your tracked portion, for example in this case arm 955 as shown. If other portions of your hand are sensed, such as your fingers (in the case shown from their natural features such as edges or tips) pinching motions and other finger gestures can also be used in a coordinated manner with the display.

More than one object can be tracked, for example both hands. This can particularly be accomplished as disclosed in co-pending applications. Also discussed there is the use of a stereo pair of cameras such as 916 and 917 having a baseline between them, such as shown in dotted lines.

It should be noted that the tracked object could be something you have on your body, such as a hand puppet, whose own hands are monitored in this way, such that the puppet may be guided by the player to interact with other puppets displayed on the screen.

Another game assumes that the graphics depicted is not graphically generated, but rather video clips chosen to suit the movement or position of the player at a certain time.

Another aspect of the invention herein disclosed concerns a display and control device particularly suited for Automotive Instrument Panels and other applications. It introduces the concept of a "Control Surface" which together with the associated display creates what I have called a "Reconfigurable Tactile Control Display" (or "RTD").

There is a great need in the industry to provide improved functionality and safety made possible by electronics while at the same time mitigating problems of driver distraction. To be really useful, this need must be met in a stylistically attractive manner, at low enough cost to enable wide spread usage. If possible, I feel a large display space further needs to be enabled on the instrument panel for many added functions such as camera video or navigational aids, which presently is constrained to small screen areas of limited utility by the limited real estate available in conventional vehicles today. And it is further desirable to have an instrument panel which can be personalized for the user, or at least for a group of users in a particular "package".

In this application I will define the instrument panel has having both a display surface and a control surface. In a conventional instrument panel, the two are completely distinct—a significantly sized Display (if any) in the range of 5 inch diagonal or greater goes in one place, knobs or other physical controls in another.

In some embodiments of this invention the display and control surface can occupy the same physical area, which means that much more space is freed up for both, relative to a conventional Instrument panel.

While the location of the invention in the instrument panel of the vehicle can be anywhere the driver needs to interact, the basic embodiment of this application (at least for near term commercialization) is located in the vehicle "center stack" region between the two front seats and utilizes both conventional knobs and other tactile control and selection means, plus unique touch screen like capabilities. These functions are desirably (but not necessarily) achieved using TV camera and image processing computer means to determine knob or finger state or location (for example). This is preferably accomplished by using a rear projection type display, and viewing the region of the screen from the rear, with the camera located near the image projector, and both controlled by interconnected computer means. (Which may be the same computer). Use of rear projection also allows a desirably large display capable of easy reading and tactile interaction to be provided at modest cost, both of the display portion and the means to read the control or finger location.

The knobs and other selection means are typically located right on the screen itself, or an overlay member thereon. This screen or overlay is thus also a control surface, on which several other forms of controls co-exist as well with the displayed data. By sharing the display area between the knob selection or adjustment functions (and their written or pictographic description), and the display functions (e.g. display of navigational charts), space is saved on the IP and larger knobs and lettering may be provided (especially given the programmably reconfigurable operation). This then promotes safety immediately by making it easier to see what is desired, or has been affected. For further flexibility and utility, the screen can also function as a touch screen as disclosed herein.

It should be noted that alternative versions might have knobs mounted in whole or in part to the side of the screen, with data concerning their operation projected on the screen Contributing even more to safety, the tactile feel of the knob, or other tactile physical selection or adjustment means, can itself be programmable, for example using programmable acoustic wave pulses providing many added benefits, and discussed further below. Note that such a reconfigurable tactile control response can be programmed to change with function selected, and/or variable affected And can operate statically too, to give the driver a chance to tell the setting of the knob by feel alone. In addition, conventional cues to the driver such as the displayed values or computer-generated speech can be used as well or instead.

The preferred instrument panel related embodiment is simple in concept and execution, allowing it to be low in cost yet high in functionality. It has only a simple video data projector (which can be of several types, such as DLP, LCOS, Flying spot or other), a screen with physical controls such as knobs attached, a computer, an electro-optical detection means (typically a low cost TV camera), and possibly an auxiliary IR LED light source and other small items. This one device can safely be used to control, if desired, nearly all the human interfaced functions of the vehicle and provide the largest possible display space at needed times for critical information besides. The screen, which can be curved or irregular in shape if desired, and the physical controls thereon together with associated display and control software can be interchanged easily and inexpensively allowing a vast array of different option packages.

The functionality and cost are further aided, by the combination of both sensing of physical controls and finger touch in the same system. This allows virtual controls (in which finger touch based selection or operation is undertaken in response to projected data) to be provided at very low cost, further expanding the utility of the device. In addition, the RTD invention herein not only has quasi-conventional tactile controls such as knobs, but may employ other passive and active tactile feedback characteristics to provide information to the user when minimum glance time is available to look at the display.

A simple and easily understood format for the control surface/display screen is also disclosed which allows what I feel is the preferred transition for the average motorist from the instrument panel of today, to a reconfigurable one of tomorrow. This is based on common "radio" and "heater" controls (today called Audio or Entertainment, and Climate, or HVAC respectively), including their conventional position in the center portion of the Instrument Panel The RTD invention is thus safe and easy to use, being similar in certain key aspects to the conventional instrument panel of today (for example in its use of quasi conventional knobs, sliders and switches). It appears to comply with the US National Highway and Traffic Safety Administration Federal Motor Vehicle Safety Standard 101 for Controls and Displays (FMVSS 101). The RTD may be one of the few, and perhaps the only, fully reconfigurable device capable of doing so, an extremely important feature. And it easily meets and exceeds the recent industry promulgated guidelines in so far as glance related Driver Distraction issues are concerned Because of its unique design in which the control surface and the display co-exist, the invention can provide, at affordable cost, 5-10 times the effective display area (relative to conventional LCD screens used in vehicles today for navigational systems and other purposes) and provide a substantially increased control surface and its attendant ease and flexibility of operation, while still meeting the FMVSS 101 regulations regarding labeling of the controls. This affords many advantages to the user, for example:

- Larger lettering or pictographs can be used; making quick glances easier and for many drivers, this could be the difference between something of great use, and something use-less. The lettering can be in ones language of choice as well.
- More data of the same size can be presented at once obviating the need for frustrating menu selection.
- The size of any tactile control devices such as knobs can be larger, also because they can provide multiple functions.
- Because the display is also a touch device, the much bigger nature of it also allows one to more easily select or "hit", in the case of a displayed button say, the desired function.
- Video and other data can be presented alongside text data
- Video data and close-ups of certain sections can be provided. One example is a navigational display with a inset showing detail, both side by side
- Video and other data can be provided for driver confirmation or designation in the case of critical images and stereo camera pairs.

Another advantageous embodiment herein is directed at use of the invention to aid backing up—a problem which is the cause of large numbers of accidents and deaths every year. This also helps see in blind spots, particularly that on the side of the vehicle opposite the driver, where the right side mirror is inadequate or poorly adjusted.

An embodiment of the invention suitable for use in the home is also disclosed, which can provide commensurate savings in switch gear and displays of individual appliances and other devices such as furnace thermostats and the like, as well as vastly improved ease of use and other features. The home application in conjunction with the car further reinforces the familiarity and commonality of controls and provides added economies of scale. This application expands on the use in the home, particularly with a kitchen based control system. In the home application commensurate savings in switchgear and displays of individual appliances and other devices such as furnace thermostats and the like are expected. In addition, the home application in conjunction with the car further reinforces the commonality of controls and provides added economies of scale.

Figure 10A:
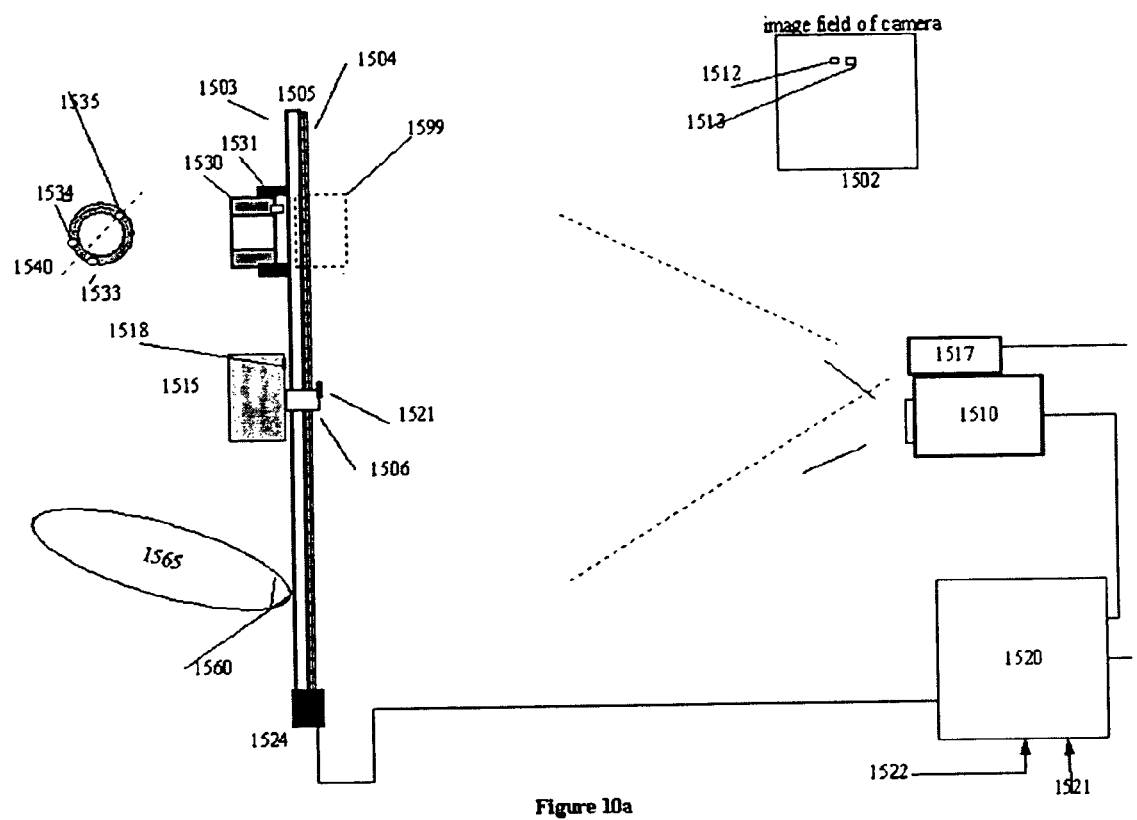
FIG. 10 illustrates a preferred embodiment having physical details and touch features

As shown in the diagrammatic side view of FIG. 10a, a center stack of an instrument panel (not shown) is equipped with a large (for a vehicle e.g. 10×12 inches) rear projection screen panel 1505 comprising preferably made of non shattering light transmissive plastic sheet 1503, having in this example a myriad of small glass beads 1504 on its back surface which serve to widely diffuse the light incident on them, in a manner creating minimum backscatter.

The beads are encased in black plastic, with only the tiny spherical surface near their focus (which due to their index of refraction of approx n=1.9 is approximately at their surface) protruding from the black matrix holding them. This design increases contrast of the display, and is also useful for keeping light from the driver's side from entering the optical system of the invention, and for shielding the inner workings of the device from view of persons within the vehicle. A typical commercial screen of this type is 3M "vikuiti" brand XRV type NP, which is ⅛ inch thick approximately, with glass beads 002-003" in diameter. This screen is however made of a black film with the beads precisely place in it (using 3 M patented techniques) which is laminated to the screen material desired. Thus it is possible to have screens of other thickness' and shapes. 3/16 thick and ¼ thick screens have been successfully used with the invention.

Thicker or thinner screens can also be produced, which can be made by laminating the base film containing the beads and blackening material to another material, either flat or curved, and typically of plastic. For the bead type material to work as designed, the open aperture of the beads should be toward the projector. A version of this having a fresnel lens incorporated is called "Black bead" and is made by Dai Nippon printing co in Denmark.

Alternatively screens having less dispersion vertically than horizontally can be used, as well as ones tailored using holographic diffusers or gratings or other optical elements such as lenticular arrays to disperse light preferentially to the range of viewing directions of driver locations. This can be really useful in projection systems in optimizing the light available to the driver, and to a lesser degree the right front seat passenger. In some cases, prismatic materials, which may be in the form of films may be used to divert light from the screen in specific directions. For example, projected light hitting the bottom of the screen in region toward the floor can be bent upward toward the driver using a prismatic film at that region, where as no film, or less refractive film would be needed at region in the middle of the instrument panel. At the top one might use such a film to bend the light in the other direction toward the driver.

While the display screen/control surface extends out of the plane of the paper. While shown flat in this drawing, the screen/control surface in many cases is curved for stylistic or other reasons. This is particularly true since the screen is large and needs to fit in with other parts of the instrument panel, which are generally curved themselves. The curvature can be either convex, or concave, or compound, and can be of irregular shape, and of a shape staggered in the z-axis.

A computer controlled display projector 1510, controlled by computer 1520, illuminates the screen. This projector may be on axis as shown or-located at angle to the screen normal in either plane.

Video imagery or Computer data including messages and other communications 1521 down loaded to the computer

1520 from external sources by known means, or from sources 1522 within the vehicle itself, can be thus projected on the screen.

In this embodiment, knob 1515, and if desired, further knobs or other control details not shown for clarity, are mounted, for example with pin 1506 directly to the screen 1505 so as to be rotatable thereon to various positions which are sensed (for example by electro-optical means such as camera 1517 which looks at points such as mark 1518 on the back of the knob 1515 or other wise related to knob rotational position) and reported to the computer 1520 which in turn calculates the knob position, functions or other data and executes the control function desired by interfacing with the cars electrical and control system and further causes the display device 1510 typically illuminated by a white light xenon or other lamp to project suitable information concerning same onto the screen. This information is typically data concerning the knob position and the setting resulting there from. The same camera can view and provide data used to determine the state of a host of different tactile physical selection or adjustment means such as knobs sliders, dials, or switches on the screen. In addition, their various positions and changes therein can be analyzed nearly simultaneously by the computer 1520 and appropriate control and display responses made.

Alternatively the camera can observe a flag member such as 1521 on the backside of the screen and rotating with the pin as the knob is rotated. This gives the best contrast (as the beads don't interfere) and in this case a retro reflector flag can be used (which otherwise has difficulty operating properly if the light travels through the beads, The image field of the camera 1502 for this knob configuration is shown for the knob in the initial position 1512, and for rotation 90 degrees counter clockwise from this position(as viewed by the camera) 1513.

The knob does not have to be held by a pin, and can be fastened to the screen by any appropriate means, including adhesive and from the outside circumference of a bearing such as 1531 holding a second knob such as 1530 as shown.

In addition it is possible to have the target or other datum observed by the camera be on the knob side of the screen. For example consider the knob targets used in one illustrative experimental example were simply aluminium portions of the knob housing 1530 itself, which had been blackened where the targets weren't. The knob as shown is held from its outside in bearing race 1531 attached to the screen 1505. The knob is hollow which allows data to be projected to the screen in the middle of the knob by projector 1510. The rear of the knob facing the camera 1513 is shown having in this example three targets 1533-1535 forming an isosceles triangle whose base line was between the two closely spaced targets, and the axis of the knob being defined as a line 1540 perpendicular to the base to the third target 1535 at the apex. This arrangement allowed the pointing angle of the axis to be determined easily by processing the image obtained by the Sony CCTV camera used. This image was first acquired, by a Matrox (Montreal, Canada) "Genesis" image processing board in computer 1520, and then using the Matrox Mil 4.0 image library software, processed first to find the blobs represented by the targets, and then the triangle calculation was performed. In another and preferable version, an added step including first subtracting the image obtained from a previous image taken under another condition not representing the instant situation, and then finding the blobs and the triangle calculation.

Once the knob location was found, a lookup table relating to the angle obtained was entered to find a value of the variable desired to be projected. In one case the projector was controlled to project a line on a radio dial, indicative of where the knob, in this case representing the tuning knob, was in terms of frequency. In another case, the same knob was used to control the projector to project a heat bar of different color and length dependent on knob rotational position. In each case output signals were also provided to control the physical radio or heat-mixing door of the vehicle HVAC system.

As discussed in co-pending applications and further on in this application, is also possible using the invention to sense the location 1560 in two axes of a finger touch on the screen, such as finger 1565. This capability gives added flexibility to the design of control systems using the invention, as it allows virtual controls (such as touch box icons) to be displayed arbitrarily, and the driver's response determined by the location of touch, or absence thereof.

Note that the TV Camera above can be any suitable device, for example a standard 640×480 pixel RS 170 standard camera. High resolution is typically not needed to see either physical detail position or finger location. However, it is generally desirable to have a progressive scan or pixel addressable camera, which can allow one to scan only certain windows of the image, therefore speeding up the sensing of all the objects in the windows. For example, if there are two knobs with windows 100×100 pixels each, and 5 virtual touch icon boxes projected of 30×30 pixels each, this means that only 24,900 pixels are needed to be scanned to determine the basic information of two knob positions and whether any of the 5 icon boxes was touched. This is less than 1/10 the number of pixels in the aforementioned camera, which accordingly can operate 10 or more times faster than the RS170 standard of 30 frames per second. This is more than ample to track knob turning or touch in any tests to date.

The camera shown can view the datum's and fingers from whatever angle is satisfactory. Using a beaded screen like 3Ms there is an approx ±30 degrees angular attack with respect to the normal that one can get data from datum's on the drivers side of the screen thru the beads of the screen. This is not a limit if the datum's are on the camera side of the beads, or if the beads are otherwise not in the path of light reaching the datum's and returning to the camera, such as shown below relative to the slider 155 and knob 1545 in FIG. 10*b*

FIG. 10*b* illustrates another type of design of a physical detail such as knob or slider, in which the detail itself contains the screen surface on which information is projected through a clear path within the detail itself, typically a hole in the detail, or in some cases the detail itself is made of clear plastic. The projector 15 10 is fed data by computer 1520 to cause it to display on the screen 1505 whatever image is desired for viewing (which could be a blank image as well). In the back region of knob 1545 an annular ring of light from the projector illuminates the annular ring of the knob where datum's lie. In this case only one datum 1547 is shown, a radial line shaped one, but more datum's and other shapes can be used as desired to suit the accuracy requirements needed. The datum's can lie on the back of the knob on the driver side of the screen as shown above, which allows the knob to be transparent in its center. Or as shown in this figure the screen can be cut out to form hole 1548 in the center with the actual diffusing portion 1546 of the knob located on the knob 1545 itself, which rotates in a bearing race 1542 affixed to the screen with adhesive or other means. In this case the datum's, such as line target 1547 are rotating radially like a clock hand. The hole may optionally be covered by glass window 1544 to seal the region behind the screen. The line target (or other datum used) in this case can be a retro reflector, such as scotch light 7615 material having very desirable return signal characteristics when the light source axis is close to the projector axis as shown. This creates a much higher signal to noise than other wise the case with the knob as shown in FIG. 10a for example, as there is no background backscatter from the beaded screen, and there is a very high (often 1000:1 or more) return from the beads of the retroreflector used as a datum. 3 datum's like In FIG. 10a, the projector itself has provided the illumination for the objects imaged by camera 1517. It should be noted that since measurement can be made very quickly using suitable cameras, that the projector need only be on for a short time, e.g. 10 msec. At this amount any illumination used to measure will not be readily seen by the user, and the screen will just appear a little gray.

It is preferable in many cases to use an illumination source for sensing purposes independent of the projection source. A good choice for this is a LED source, usually comprised by a plurality of infrared Leds of wavelength 880 or 940 nanometers, though other choices can be used as well. Such a source cannot be seen by the user, allowing sensing to take place even with the projector off. And by using an LED, one can filter the camera image with a band pass filter to allow only light in the Led wavelength region to be imaged. In addition, the LED source can be controlled by computer 1520 to fire at designated times, for example on and off during a given measurement to allow the camera images obtained in each condition to be subtracted in order to eliminate background readings.

Camera 1517 images the reflection back from the datum 1547 to obtain an image 1549 of the datum (shown on a representation of the image field 1595 of camera 1517) which is analyzed by computer 1520 to determine the circumferential angular location of the datum and thence the knob, and thus the selection or value desired by the user. This datum may be in reference to optional targets on the corners of the screen or elsewhere used to register location, independent of camera position and vibration if present.

While described as a knob movable rotationally, other tactile physical selection or adjustment means like sliders, switches, levers or the like which are movable linearly, angularly, or in other manners can be used in a similar manner. For example FIG. 10b further illustrates a slider 1550 with a handle (moved by the driver or other user), 1554 which slides in track 1551 fastened by adhesive to clear plastic window member 1555 which itself is glued to the front of screen 1505, preferably in such a way as to seal the opening 1560 slotted in the screen. The rear surface of member 1555 desirably matches that of the screen outer surface such that a tight gap free adhesive bond can be made. This arrangement also has the same benefit as discussed relative to the use of optional glass window 1544 with knob 1545 above, namely that datum 1558 observed by camera 1517 to determine its linear position up and down on the drawing page, can be a retro reflector.

In addition light from projector 1510 in this case passes through slot 1560 as shown with the projected light being dispersed from handle outer surface 1565 which is diffusive and acts as a screen, such that information relating to the slider can directly appear on surface 1565 of the slider handle itself. (Note that the projector and camera are typically farther back in their optical path than able to be represented in the drawing for clarity).

There are several types of rear projection screen arrangements, which use different diffusing elements such as 3M Vikuiti glass beads and black coating 1504 applied to the rear surface as shown, or microspheres distributed through the bulk of the screen plastic material 1505, surface roughness scattering by grinding a surface, such as surface, or lenticular elements, as discussed in co-pending applications. Alternative to cutting a hole or slot in the screen such as 1548, or 1560, one can remove scattering elements from the screen in the region of the knob (or other physical detail such as a slider above). This allows light to pass substantially undisturbed thru the screen from the projector and auxiliary sources such as LED's if used. This can be done for example by removing the vikuti beaded film in the region shown in dotted lines 1599 behind knob 1530 in FIG. 10a and thus exposing at least a portion of the clear path within the knob to undiffused (that is not scattered) projected data. In this manner too if the not scattered portion is sufficiently large, knob target 1531 can be directly observed by the camera 1517 and a retroreflector used if desired providing very high contrast. And projected information can be displayed on a diffusing screen more desirably located near the outermost edge of the knob away from the screen in order to minimize obscuration, which is especially a problem with small diameter or width knobs switches and sliders, which stick up from the surface of the screen substantially in order to be easily gripped.

The slider axial position along the track is also determined by camera 1517 coupled with computer 1520, and this data is used for control of controlled items by the slider, as well as to control the graphical representation of slider labels, slider variable data, or other data projected.

Optionally the slider handle 1554 can also be a knob, rotatable about axis 1570 of the handle, generally perpendicular to the surface of screen 1529. This handle rotation can also be sensed by camera 1538 in a manner similar to knob 1530 or 1545 if desired. In this manner, data can be entered by a user using the device, which has a dual function both of slider axial position and handle rotation position. This would be complex to build conventionally, but is simple using xy sensing provided by non-contact machine vision which easily can track the position and orientation of both the slider and the knob.

One useful projector display device 1510 are those having MEM's based Digital light processing (DLP) chips by Texas instruments. Another is a system such as employed in the 3M brand 7640i projector, having three LCDs each modulating a given color, R G or B. It should be noted that for the automotive application, high resolution is not required and relatively inexpensive MEMS or LCDs chips can be used (in comparison to HDTV applications, for example). Even less expensive are the LCOS (liquid crystal on silicon) chips on the horizon, which, like the DLP chips, operate in reflection Today projection devices such as these used for presentations in conference rooms are illuminated by high intensity white light projector lamps which are very hot, require high voltage, and expensive. It would be desirable to have another source for automotive use. But such conference projectors are meant for big areas (e.g. for presentations) and the vehicle only requires a fraction of the area to be illuminated (e.g. 10×10 or 100 inches squared, vs. 40×50, or 2000 inches squared—or more—for a projector. If the ratio is 20 times, the light power can also be so reduced. This then allows one to use smaller bulbs, bulbs of more long lasting design, run bulbs in de-rated manners, or the like in order to achieve minimum cost and/or maximum bulb life—an important issue for automotive or other use.

More appealing would be solid state sources such as diode lasers or LEDs as an illumination source. We have run a test with a LumaLED superbright red orange LED, which produced somewhat acceptable results over a smaller area. It was 55 lumens vs. 800 to 1000 of a sample small projector such as a 3M model 7640. White as well as colored LEDS of 120 lumens are now available as well.

One generally needs to even out the light field of the semiconductor sources to get best results when using the above projected image modulating technologies. This can be aided by putting a suitable holographic diffuser in the path of light from the LED. These can be ordered from Edmund optical co, with various dispersion angles as desired.

Finally a third type of knob design has a clear center portion 1585 that is fastened (for example with clear adhesive 1586) to the screen 1505. Rotating about this clear center portion is knob 1590 having one or more camera observable datum's 1591. This too can employ a diffusing outer surface if used with appropriate screens, or one can just look through the clear portion 1585 at data displayed on the screen 1505 underneath.

Figure 11A:
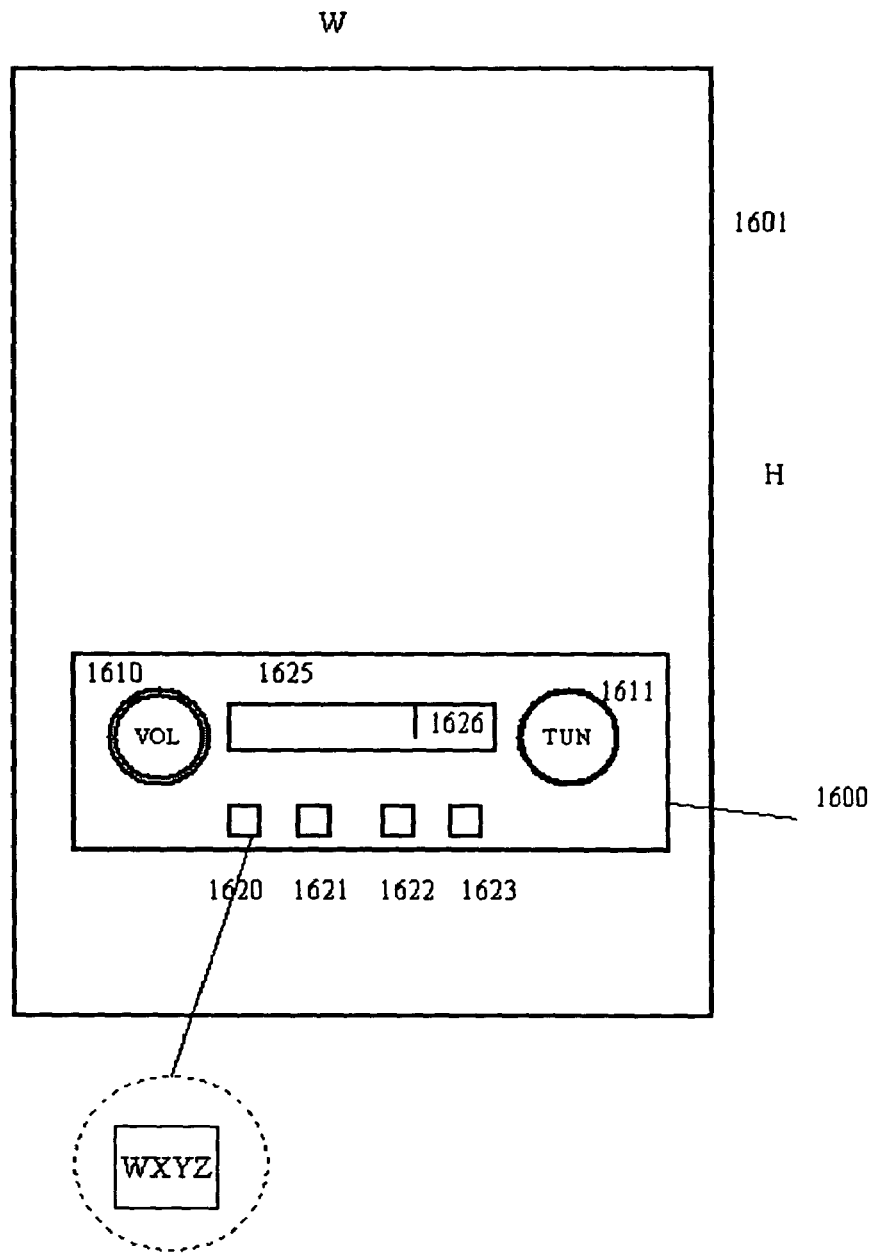
FIG. 11 illustrates an embodiment of the invention employing knobs of FIG. 1 based on a traditional Radio layout, located in the center stack region of the instrument panel of a car, and its reconfiguration under computer control into climate controls.

FIG. 11a illustrates a front view of apparatus like that shown in the side view of FIG. 10, in the form of an embodiment of the invention employing knobs of FIG. 10 based on a "traditional" Radio layout 1600, located on screen 1601 in the center stack region of the instrument panel.

In FIG. 11a example, the physical control details on the screen itself are the two knobs 1610 and 1611, and four pushbuttons 1620-1623, which may be virtually projected and touched to operate using the touch screen function, or physical buttons which can be sensed optically using a camera such as 1517 or otherwise. (Note other numbers and sizes of knobs and pushbuttons may also be employed, and the buttons can be virtually projected and actuated by touch if desired, rather than physical pressing in). The projected image portions on the screen are the surrounding lettering and graphics, and the radio dial numbers 1625 and indicator needle 1626. (Like many a 1950's car radio, graphical representations of which can even be lifted from actual radios of the era, and projected onto the screen 1601).

Projected graphics and alphanumeric characters are also used to illuminate the knobs, such as Vol and Tune shown. This illumination can be next to the knob, or if the knob is constructed as shown with a transparent center section, right in the middle of the knob.

Similarly the buttons can be so illuminated with projected radio station call signs, such as WXYZ, or the frequency, or some other delineator. The knob centers can also contain projected information if desired, as can all regions around the various controls. As shown the function of the knobs, for volume (VOL) and tuner (TUNE) are displayed in the middle of the knob as shown in other figures. Alternatively, the data can be projected below or above the knob for example as desired.

A typical height of such a device would be H=12 inches, and width W=10 inches, and in some vehicles taller or curved or wider devices might be employed. Smaller devices can also be used, but are less desirable in most cases as one big advantage is screen size for display of important information such as from backup or right side blind spot cameras.

The region at the top of the screen most in the driver's field of view is desirably reserved for key images such as backing up or right side camera views, or key data. This area can also be where virtual controls operated by touch are used as desired.

Figure 11B:
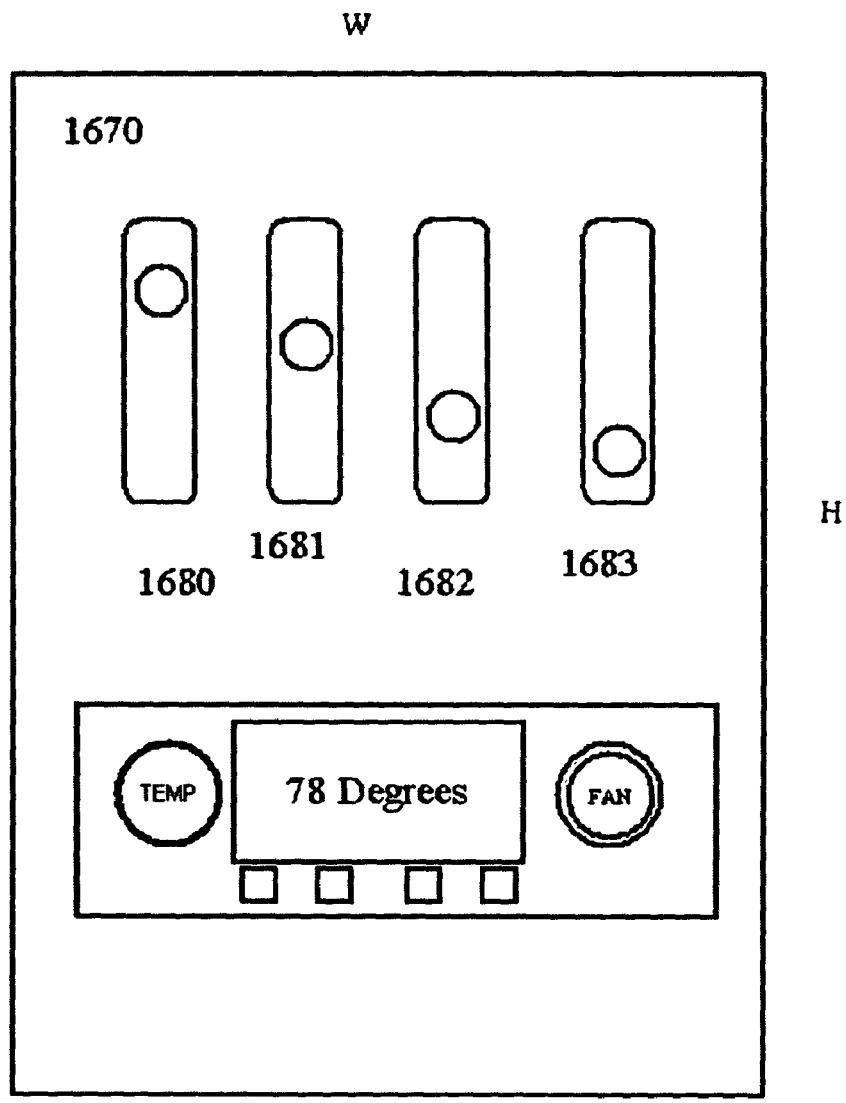

FIG. 11b illustrates the case where the function is changed from a Radio to a heater; more correctly today called Climate Control or HVAC in the trade (heating ventilating and air conditioning). The buttons and knobs are knob re-labeled with projected data to suit the new function. For example the left knob now is the temperature, and the right knob is now fan speed. In this example, pressing a button in (either a physical or real button as desired) may be used to control air direction choice as one example.

Entertainment and Climate are the main control sections found in the vast majority of vehicle center stacks today. Since this one reconfigurable control of the RTD invention accommodates both, this leaves more space for an associated Video display, for larger knobs and lettering, and other functions too as desired. And they may be, if desired, provided in a manner similar to today, that is with physical knobs and buttons, in the usual expected places (e.g. with knobs on both sides of scale or other display). The only difference is that the entertainment function is reconfigurable with the climate.

But it needn't stop there. For example FIG. 11c illustrates the screen center stack with neither radio or heater projected—in other words in its empty state, with the system off (assuming the buttons were physical buttons, if they were virtually projected, they wouldn't be present either). Clearly anything else desired may also be projected through appropriate software, which could be controlled with the two knobs and 4 physical buttons shown.

Where buttons are virtual projected types, small relief details permanently on the screen such as ridges or grooves or indents are useful for finding the projected button location by feel. The buttons can be chosen to be projected at or near the desired locations where the relief details are, for whatever function radio, heat etc is desired. For example, the region of a virtual projected button 1620 for example could be slightly indented, so ones finger could find it easily. These indents if not severe, will not unduly disturb other information projected in the same place. But an indent in one location say for a radio preset virtual button, can be used in another mode, say as a heater air distribution virtual selection button, as shown in FIG. 11b.

Screen Switching

To switch from one function to another (e.g. Radio to Heat), one can use a variety of means. For example, on the steering wheel one may include switches for the various function groups—climate, entertainment, comfort, etc. Pushing or scroll dialing or otherwise actuating a switch would switch the function to a heater for example from what ever it was (e.g. a radio). Or one can use a simple touch switch on the steering wheel or elsewhere to scroll through the functions desired. In addition or alternatively one can use voice recognition to do this, by just saying "heater".

In addition or alternatively, function switches can be on the RTD itself, and can be hard physical details, or in the case shown, "soft" using projected icons such as 1650-1653 on the RTD screen 1660 which is equipped as disclosed with touch sensing capability to respond to finger touches thereon. These can be used with relief features to aid their finding by touch as has been pointed out above and in referenced applications. As shown, round switch icon 1651 is shown illuminated after a touch by a driver to select it (the function selected such as climate, can also be displayed). And those functions not selected can be displayed too, but for example smaller or less bright, or another color, so as to distinguish them from the currently selected one.

Other external switches can be used too, for example on the left or right armrest. This is particularly easy if a limited number of screens are used, for example 3 or 4 (climate, Entertainment, comfort, and safety, as will be described below). Optionally, illumination of icons can be under computer control and selected to only illuminate those for which action may be needed.

The use of soft functions allows the maximum screen space to be freed up, for example to facilitate display of TV images and other information. One such image is the region behind the vehicle, taken with one or more TV cameras as previously noted. This is ideally displayed in the region at the top of the screen along the driver's line of sight.

Selection can also be done with a multi-axis knob, which can be pushed in to select in sequence, or a 4-axis knob as disclosed above to allow one to select one of 4 displays simply by momentarily jogging the knob to one of the 4 quadrants. Thus the radio volume knob could also be a selection knob for 4 different functions—e.g. Radio, Climate, CD/DVD and telecommunications.

A typical scenario for operation is for the driver to unlock the car with a radio transmitter, which then signals the computer of the RTD to display in region 1670 shown in FIG. 11*b*, the view behind the vehicle taken with camera or cameras not shown looking rearward. This view is displayed until forward gear engaged or some manual override occurs, to give the maximum time for the driver to see the image of things or persons behind him.

Also in the initial condition, the Climate control display such as that of 11*b* may be activated. Settings are made, or not made, by the user, and then after a few seconds of inactivity (variable by user setting) the system may default to the entertainment screen of FIG. 11 a, unless the climate controls are being worked by the user.

Other manual overrides would be to cause an additional screen(s) to be projected and set by the operator.

For those who are audiophiles the whole region 1670 above the radio/heater section may be devoted to auxiliary controls for CD equalizers, and mixers. For example using virtual sliders 1680-83 to mix sounds from several sources. These are ideally provided in a virtual manner using the touch sensing capabilities of the invention, but can alternatively be selected with a multi-axis knob such as shown above or another type of selection device such as mouse, joystick or the like. Or alternatively provided as hard physical details.

In the above figures, detents of the classical mechanical kind can be built into a knob or slider and it's mounting. In addition, the computer such as 1520 may also control vibrator wave source (such as used for example in Cell phones or pagers) 1524 to excite the screen and any physical details such as knobs or switches thereon to provide a "programmable" feel in conjunction with any visual data presented. This can give a different feeling or vibration for each position of knob 1610 or 1611 for example. And one can have different frequencies than the other, so as to be distinguishable one from the other. The actual location of the settings can be determined by the point at which the feel is felt, as a programmable position detent, so to speak. In this case the display may be varied as well. The sensed indication of the knob datum in one of the rotational positions is used to provide input to control the programmable wave source 1524. For example if the volume knob is most counter clockwise, the volume could be low, and the vibration amplitude low as well, when the knob was fully clockwise to its max setting, the vibration amplitude could be highest.

Lettering, Labeling, and Knob (Or Other Physical Control) Size.

For most automotive control applications studies by transportation researchers suggest that lettering for controls in the center stack more or less in the drivers line of sight, should be at least 5 mm×5 mm per letter, and larger perhaps for elderly drivers and others who could benefit by it. For a high resolution density of 5×5 pixels per character for example, 5 mm high letters would only require 250×250 pixels to be projected for a 250×250 mm (10×10 inch) display. This is easily achieved with even modest projector or other display technology today. Of course, higher resolution allows more dense displays, for various data and other images that could be desirable. Resolution of 1280×1024 pixels is commonly available if required (albeit at more cost).

I believe that lettering 7 mm high or more is very desirable for ease of reading while driving. If the character size is for a simple example 7×7 mm, then a center stack of 250 mm (10 inches approx) width can accommodate 250/7 or approx 34 letters and spaces of equal size. If two large horizontally aligned knobs of 50 mm are used, which are big, and easy to grasp, this reduces the amount of lettering space to a minimum 50 mm in the direction horizontally through the knobs, or approximately 22 letters, if one goes right to the edge of the center stack with the projected data (an advantage of the invention in its projection embodiment). This is still sufficient for most purposes, either to show data relating to the knobs, or to add information in the space between the knobs. But only with a large screen substantially running right to the edge of the available space in the center stack (or elsewhere) can one achieve having such large letters, and such big knobs.

Knobs and switches are today the most common and accepted physical control means for automobile instrument panel use. It is my opinion that knobs of at least 25 mm in diameter are desirable for this application, and preferably 35 mm and above for use by older people or those with disabilities. And people in general, who wish to grab a knob without looking too hard where it is. Larger knobs such as those in the 35-50 mm diameter range typically allow more selection positions and may also more easily incorporate clear centers through which screen data concerning the knob action can be projected and viewed. Or as pointed out elsewhere the knob front surface itself may constitute the screen, which diverges light to the driver representing data projected on to it. The invention thus comprehends projection of data through the center of knobs, sliders or switches, aiding comprehension Where smaller knobs such as 25 mm are used, one may of course put more of them on a given screen/control surface, than if knobs twice the size are used. Again the availability of larger lettering space for these knobs is desirable. Realizing too, that the lettering size can be varied by the computer controlling the display in order to suit the needs of the driver. And in special high stress situations it might be automatically increased in size (or conversely, temporarily eliminated, in order to make room for important other information such as road hazard warnings or video images of consequence.

Preferably, the screen/control surface of the embodiments above, and other automotive instrument panel embodiments herein is large, on the order of 9×7 inches or larger, to provide the advantages of larger physical controls (e.g. knobs) and lettering, plus a substantial display area for information and video images, as well as a surface for virtual controls as needed (or optionally, added physical control details). In my opinion it should be as large as possible with in vehicle in question, and it is not unreasonable to consider even 12×14 inch or 10×18 inch RTD control displays. And some vehicles could even employ more than one such RTD device within a given instrument panel complex. For example, they could be in an over-under arrangement, or one on the right side of the steering wheel with another on the left.

The position or movement of any knobs (rotation) or levers/switches (linear motion) is monitored, as is the location of finger touch on the screen (where virtual controls are desired). In one preferred embodiment, the same machine vision system performs both functions, and is integrated with the computer control of the display and the force feedback. The total system is elegantly simple, and allows for a myriad of additional features. Particularly of interest are those in which the tactile aspects of the instrument panel can be tailored in their entirety to the needs of individual users or the desires of individual vehicle model development.

Figure 12:
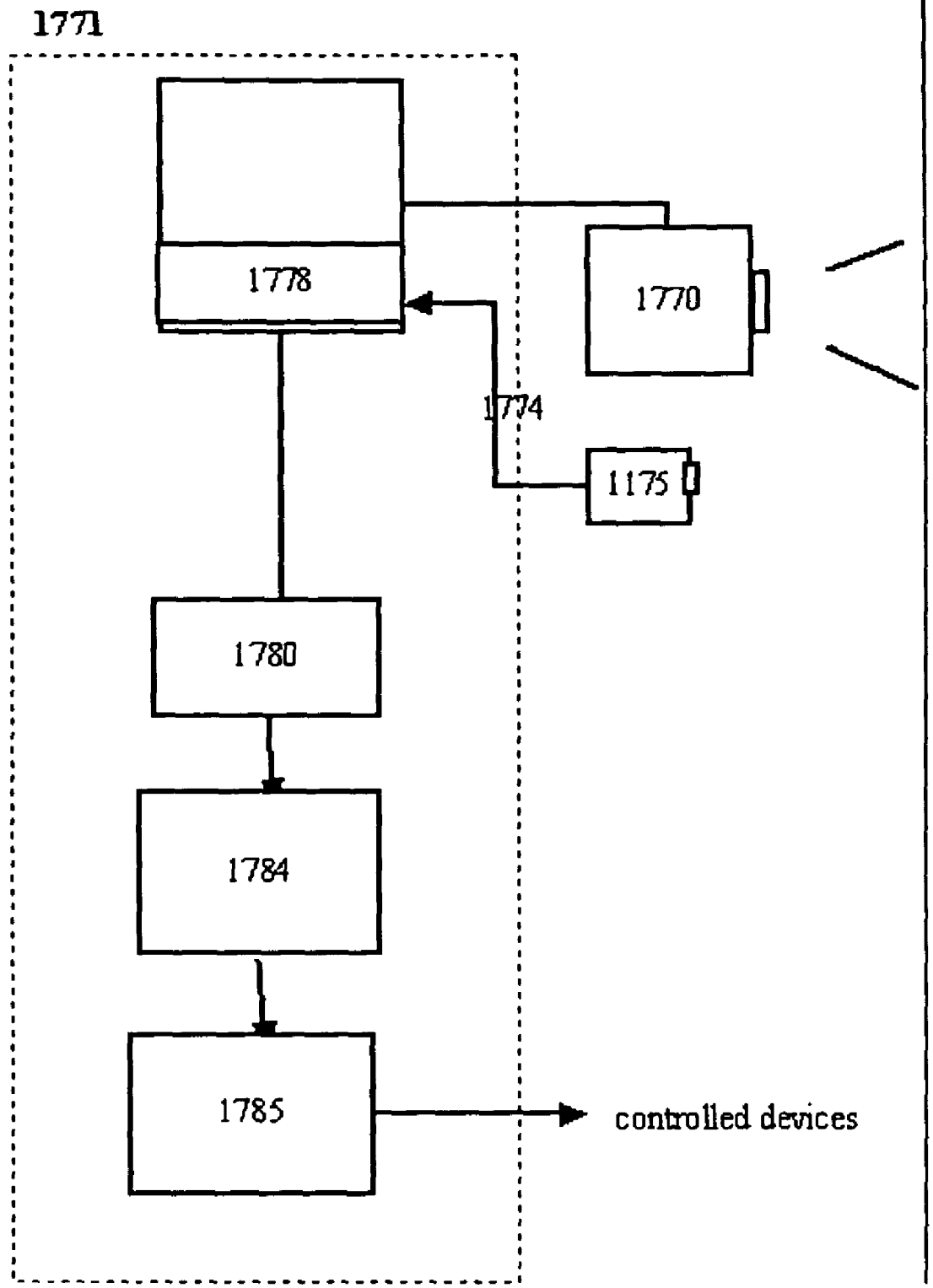
FIG. 12 is a block diagram of sensing and control steps.

FIG. 12 is a block diagram illustrating control of various devices by a PC based version of the invention, in which the projector unit 1770 is controlled by PC 1771 in response to programs resident thereon. Image data 1774 from Camera 1775 is processed 1778 by Matrox MIL software resident in the PC. Data from the processing is analyzed 1780 to determine position of fingers or physical details as fro example described above, and from this a determination 1784 is made as to what control actions to take, which action data 1785 are used to control devices such as motors, relays or other devices, and to generate appropriate signals to change the display accordingly.

Figure 13:
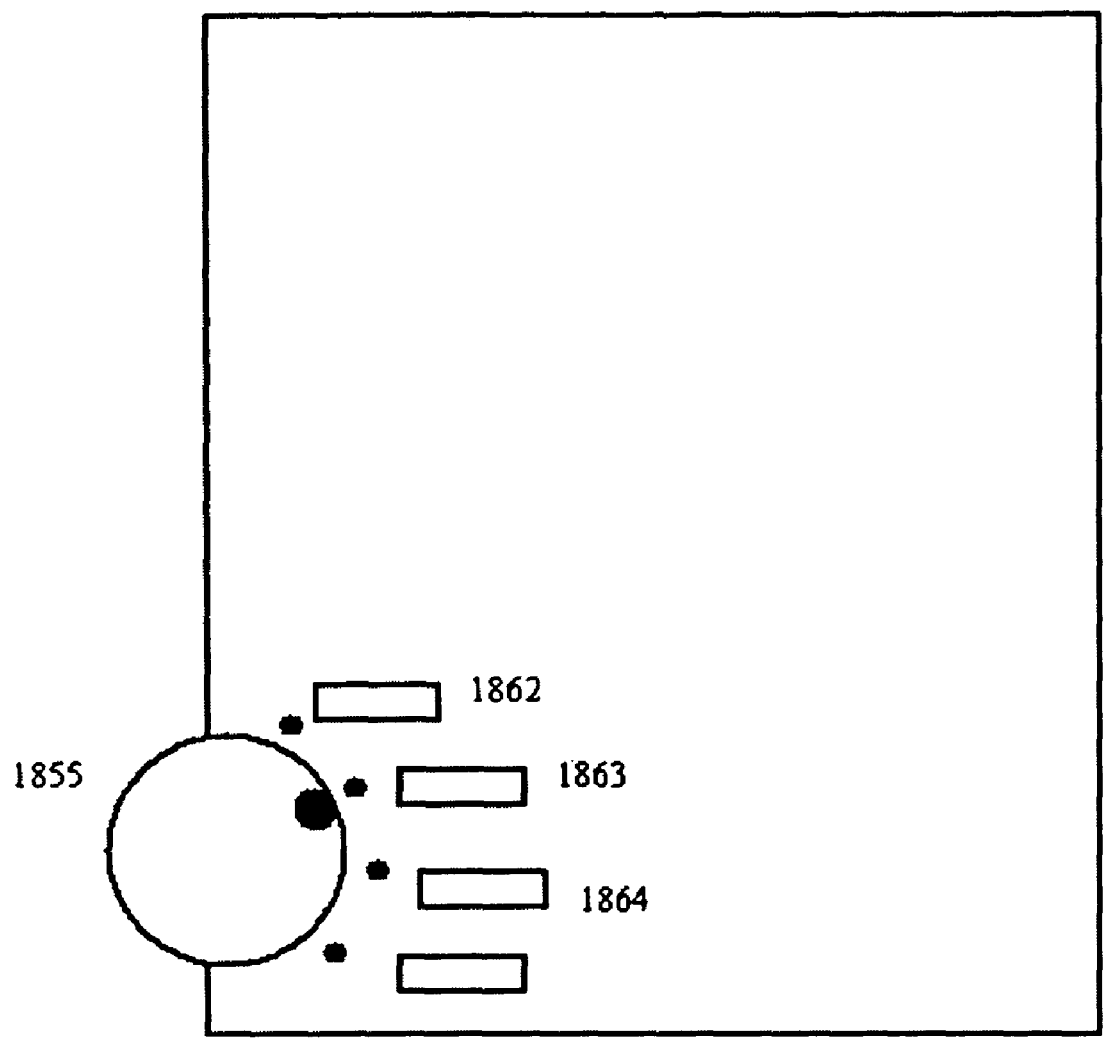
FIG. 13 illustrates a screen/control surface of the invention.

FIG. 13 Illustrates a curved screen/control surface of the invention, which may be curved into the plane of the drawing at its top and bottom (convex) or outward (concave) or any curve desired, including compound curves, as long as the projector focal depth can extend over the surface area desired. Typically I have found that a 3-inch focal depth can reasonably be maintained for the size of letters used, without recourse to design of special optics to account for curved image surfaces. The machine vision portion of the invention typically can have a much larger depth of focus, as focus plays less important a part in the sensing. It should also be noted that the outline of the screen could be anything desired, and does not have to be the rectangle shown in the drawing.

A novel arrangement wherein a large knob 1855 of the invention is off to the side of a curved screen 1860 like FIG. 4a is in this case label markings such as 1862 and 1863 and 1864 are projected on the screen corresponding to knob positions selected. They can be projected all the time, or three such labels such as 1862-1864 can be only those of the instant selection plus one ahead and one behind it in the direction of rotation for example.

Figure 14:
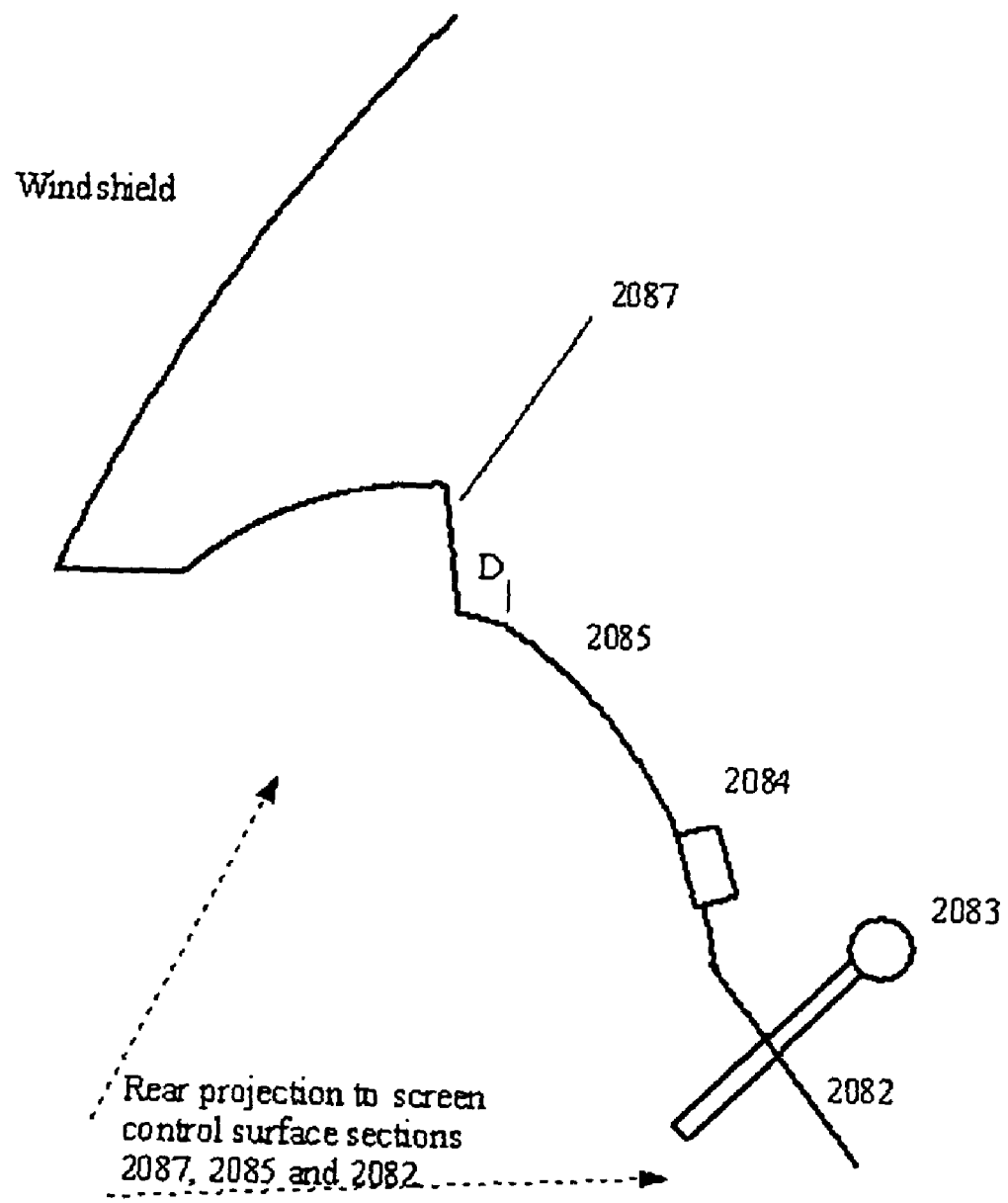
FIG. 14 illustrates a curved screen/control surface of the invention.

For example, consider the center stack of FIG. 14, which illustrates a surface being curved toward the windshield in region 2085 and then having a more vertical section 2087 indented a distance D. It may optionally also be tilted toward the driver an angle to the plane of the paper if desired. And in addition one can have a screen region 2082 in which the transmission shift lever 2083 projects through a slot, hole or other cut out in the screen with data as to its position (PRNDL for example) and possibly other variant information relating to transmission or chassis functions for example projected next to it. Knobs such as 2084 and other details can be located anywhere on the above surfaces as desired.

On region 2085 the controls such as Climate and Audio are projected and knobs and other controls used as described above. In section 2087 however, the variable focal distance afforded by the invention, allows the graphical representations of speedometer, fuel gage, and other instruments to be projected on surface 2087 aimed toward the driver. These readings vary with the variable in question. When backing up, the instruments are not needed, and instead a backup image may be projected in the same region 2087 (and/or 2085 as well). Also at other times, more important information can override the instrument and gage projection as well. This can particularly be when camera or other sensor data of immediate value with respect to safety needs to be viewed (as in dangerous traffic or passing manoeuvres), when malfunctions or other vehicle problems occur, or the like. Even in these conditions, one may not overwrite everything, but leave for example as small digital display of speed remaining on the display. (Almost all other gage functions are not time important and presumably do not need attention during other crisis periods).

Figure 15:
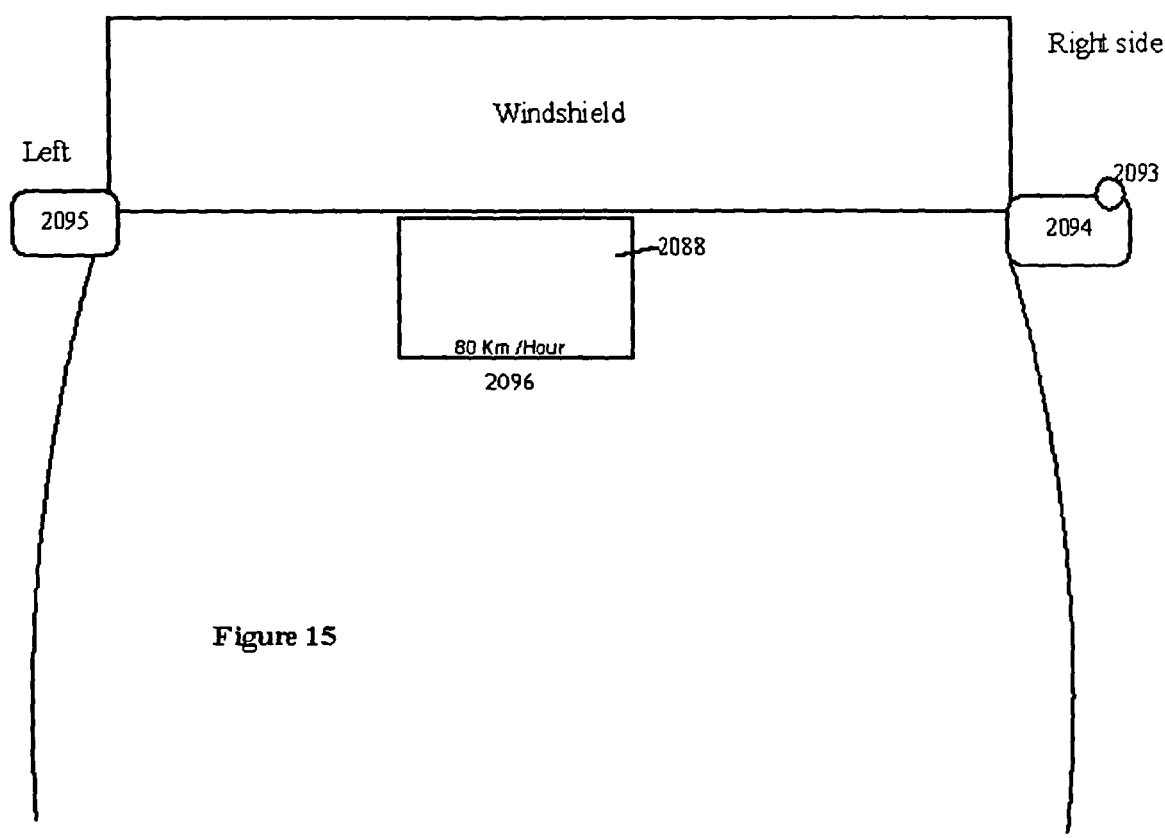
FIG. 15 illustrates a rear view embodiment of the invention.

In some cases the instrumentation display on surface 2088 can be alternated with a display of either the rear image, or an image as shown in FIG. 15 taken from a camera 2093 looking rearward along the side of the car and mounted, for example, in the right side mirror mount 2094 (also replacing same if desired). This image 2092 can be quite large (e.g. 30 cm wide and 18 cm high and easier to see than looking at the normal right side mirror (in left hand drive cars). Such side mirrors today are generally convex to provide a bigger field of view, which however results in erroneous depth determination (which is why they say objects seem closer than they appear), and can cause considerable problems in viewing vehicles approaching from the right, and in the blind spot of the vehicle. This problem is obviated by the invention, which puts a very large display closer to the driver with a wider field of view, and no depth error. While advantageously done with the projector system of the invention, display surface 2088 could be provided by another form of display such as an LCD flat panel display. It is also possible to provide, in the case of rear images to project the instrumentation such as a speedometer reading temporarily overlaid on the displayed image 2092. For maximal image visibility, one can just project small instruments (e.g. a digital speedometer number such as 2096) on the image in an overlaid manner, perhaps in color for easier visibility.

It is further noted that if one has the functions of the right side mirror displayed with greater clarity and blind spot elimination on the RTD screen, this means that no adjustment is needed for this mirror. If one then makes the left side mirror 2095 a bit convex (as all right side ones now are) then This mirror too will allow a broader field to be seen, and perhaps require no adjustment for different drivers as well. The lack of adjustment has two big advantages. It saves cost, and it avoids the common problem of someone driving off without effecting mirror adjustment (And thus not being able to see properly).

Another aspect is that the display of rear vision on the RTD screen (or for that matter another screen, for example an LCD type directly ahead of the steering wheel where the instrument cluster is in most cars today) can be automatically as well as manually controlled. As noted above, when putting the car in reverse, a rear view image can be shown-in the simplest case from a camera in the middle of the car facing rearward, preferably facing down at an angle to the horizontal so as to see objects near the bumper on the ground. Provision of this feature would materially aid in preventing deaths of small children who are backed over by their parents in their own driveways. It is my understanding that over 2000 such deaths occur in the USA each year. Here again, the fact that the RTD allows the biggest possible display on the instrument panel is a material aid in assisting a driver, for example in a hurry to get to work, or pick up another child, in seeing what danger lies behind. This is especially valuable in Minivans or SUVS with poor intrinsic rear visibility.

Another example of automatically changing the display is when one is in motion, and one swerves the vehicle, for example to pass another car. In this case a motion sensor can detect this action and cause the display to provide a right side mirror view, which completely makes visible the right side blind spot. Or it could display the center view. Or on the RTD big screen it could display both, one next to the other (At a price of reduced size for each—but still bigger than anything displayed today).

FIGS. 16 and 17 illustrate embodiments for control of sensing and projection, and image processing steps, including methods for determining finger touch and physical detail location also in the presence of significant and variant background illumination.

There are basically two issues. First is to see the correct data with the camera or other detector, in the presence of what can be strong background coming from inside the passenger compartment. This situation is discussed further in FIG. 8 below.

The second is to identify from this data the physical detail position or finger location, or the movement of either. For the physical details this can be done using relatively simple machine vision processing algorithms, such as image subtraction, blob analysis, edge transforms and the like. For the physical details this is made much easier as the knob/slider or switch datum's can be chosen to be of good or excellent contrast, and further can be made in easily recognized shapes, or colors (if colored light source is used). In addition they lie in positions on the screen known apriori to the system, such that one can program the computer vision system to look for the desired characteristic(s) in that location. For example in a certain annular ring, one would know that one needed to see three targets on a knob, or alternatively one radial rectangular target on a knob (two of the many possibilities, illustrated in FIG. 10).

In the case of the fingers it is more complex and this is the subject of several figures below. But in the simplest case, and in the absence of strong background, one again is just looking for a round or oblong shaped blob in a certain range of sizes (typically just defined as an pixel area of blob) represented by light from a projector or auxiliary source such as an LED reflected from a finger in contact with the screen. The reflection from flesh in contact with the screen works well in this way. I have found too that persons of all races on their finger tips have relatively light colored indications, and that these indications become more light colored as one presses harder, effectively it appears forcing the blood away from the finger tip in contact with the screen and making the indication larger on the screen due to the increased surface area and more distinct due the lightening effect.

Using IR LED sources operating at a wavelength of 940 nm I have found too that gloves, even many dark colored or black gloves can also be seen.

As pointed out elsewhere and in co-pending cases it may be useful to subtract the background with or without the illumination source on from the instant data. Because this adds cycle time and some transient background radiation may exist, a higher frame rate than 30 frames per second typical of TV cameras is desirable for best results. This can be achieved locally with ease (e.g. in the region of a knob) using a pixel addressing CMOS camera for example, which can easily provide data to the computer to allow it to do several hundred alternate background subtracts per second. One generally only need scan the region such as an annular ring on the back of the knob where the targets travel around for example, or a linear strip for the position of a slider datum, or a projected icon location where touch is desired (noting that unlike the physical devices whose general positions are fixed, these touch icons can be varied programmably in their location, in which case the scan region of the camera needs to be varied to match.

For the sensing of finger locations, generally speaking the touch can be anywhere allowed by the projection program (indicating to the person where to touch) or alternatively in areas preprinted on the screen or on an overlay placed on the screen These latter two alternatives are less generic and less likely to be used.

Besides the sensing of touch location in a specific location of an icon box, more generally it may be desired to sense a random gesture such as sliding ones finger along a line of action, possibly guided by an indent or raised ridge on the screen. For the generic case, one must be looking anywhere a touch can be registered and deciphering images obtained. This can be either by directly looking at fingers, or alternatively, by looking at something the finger does to cause variation, either in the intensity of reflected light, or in the position shape or color for example, of imaged datum's.

For the direct viewing case, there are several possibilities. First one can look for the characteristic shadow produced by the finger when illuminated from behind, and/or the characteristic round or somewhat round blob forming a closed polygon when illuminated from the projector or an independent light source such as a LED. This characteristic can be assumed, or in some cases taught, by just asking the driver to touch the screen in his unusual manner in a certain areas, and memorizing the signature. This too can act as a theft prevention mode too by checking this each time the car is started.

One can also train a computer based camera system, for example at the factory, said system having a neural net with different sized drivers fingers and colors of fingers, so that it recognizes all reasonably possible variants. Such training as well could be for all possible positions of knobs sliders and so forth as well, and in the case of different lighting.

The knob targets are typically bright on a black background, but they could be reversed. In this way (dark on bright background) they would not be confused by stray light brightness zones caused by large sunlight loads, for example in FIG. 1b, the three targets would be black on a white or silver annular knob background, which could in some cases if desired be a retro reflective background for added contrast.

It should be noted that the system can be calibrated for a particular user, or in general. Images taken of either a standard finger or a particular users finger on different known locations (e.g. on projected icon boxes) can be stored and their characteristics analyzed for comparison to future images for example. When a match occurs, the condition matched is determined to have occurred. To maximize the value of this in a vehicular application, images should be taken under variant light conditions in the passenger compartment as well. For example ones index finger while seated in the drivers seat can be placed on a particular icon box in the case of bright sun, hazy sun, overcast and nighttime conditions. Comparisons can be made on image brightness, contrast, shape, color, size, direction, or any other desired variable.

In a vehicle application, there is a particularly large variation in ambient lighting conditions in the passenger compartment to which the screen of the invention interfaces. This variation ranges from dead black at night, with no lights on in the car or in the vicinity, to bright sun pouring down thru the windshield, or a sunroof, directly on the screen. This situation can also occur with sun coming in from the side at certain times.

The question then is, what does it take to operate over this range? And secondarily for the bright direct sun case, is it required to so operate, since such lighting will wash out virtually any information displayed anyway, as it does today on displays which are in the open (and not hooded as most instrument clusters are for this reason).

I believe it is essential that the unit operate in all cases but the washout one, but even then I feel it should sense the physical details such as knobs, which then could be used for critical items to which washout of data was not an issue. In some cases this could require printing of characters on the screen (or an overlay) in addition of projected characters if it was necessary to always read something. In other cases the system optionally could, upon sensing via the camera of a super bright condition in the region of a certain knob (or the whole screen) switch over to a voice description of knob position for example if the actual the projected knob lettering could not be seen.

In work to date, the invention in all embodiments has functioned well for sensing at night or in modest daylight conditions. And it has functioned in all cases for the sensing of physical details. This is largely because the datum's on the knobs for example, are shadowed by the knob itself.

FIG. 16 illustrates machine vision sensing of physical control details, and presents a particular example of a rocker switch.

The sensing of target datum's (either of an artificial feature, such as a retroreflector or white dot, or a natural feature) of physical details such as knobs and sliders which move generally in the local plane of the screen and more or less perpendicular to the optical axis of the camera is relatively simple. They move in linear or rotational motion, which can be determined from the two-dimensional camera image without difficulty, since the targets of whatever type or shape, can be of good contrast (extremely so in the case of a retroreflector) and are in known general locations on the screen (i.e. in the region where the knob is situated). And, importantly, the physical datum, being attached to the screen, shadows the camera image of the screen over the region of the detail where the targets are from ambient light on the user side, such as sunlight in the passenger compartment. In other words, the light returning from the knob region is generally the same whether operation is in day or night, even though the region around the knob may be wildly different in its background illumination.

Processing of data from knobs and sliders moving in the nominal xy plane of the screen perpendicular to the camera axis is typically done by analyzing the camera image for the presence of "blobs" of contiguously lit pixels, and determining the location of the blob or blobs in the region of the physical detail in question, in the zone (also called a Region of interest) where they can appear while ignoring image information outside this zone. The blob size and shape are known which can add further information to determining the correctness of a specific blob if desired to be used in calculating knob rotational position or slider lineal position. Suitable blob processing is found in almost all imaging libraries, such as MIL, by Matrox, or Sherlock, by Coreco, both companies being located in Montreal, Canada. To eliminate passenger compartment background if any, a reading can be taken with the light source (projector or LED say) on, versus source off and the two subtracted. This operation too is in nearly all imaging libraries. We have found these steps to be very reliable in tests to date.

Somewhat more difficult is the question posed by physical details whose movement is primarily or entirely in the z-axis, perpendicular to the local screen plane, and more or less along the camera axis. This is the third dimension as it were, and is not typically able to be sensed with an ordinary camera arrangement.

The principal physical detail in control systems in this category is switches, which are not of the sliding type (which can be treated as simple two or three position version of sliders like shown in FIG. 10b for example). I have found two ways to surmount this problem, for the case of rocker switches and pushbutton switches respectively, which are now described.

Consider FIG. 16 which is not to scale in so far as the relative size of the switch to the camera and which illustrates a two position rocker type switch 1600 having a rotational axis 1601 which might be pinned along the axis to hold the switch mechanism to housing 1605. When the switch is in a Position I as shown, the reflector 1610 is close to and substantially parallel with the screen surface 1615. In this manner a maximal amount of light from LED source 1620 (similar to that of FIG. 10) is reflected back to camera 1621. Conversely, in Position II, the reflector 1625 on the opposite side of the teeter totter like rocker switch is, in the first position, spaced away from the screen a distance d as shown, and at an angle, for example 30 degrees. I have found this makes the image 1630 (in the field 1622 of camera 1621) of reflector 1610 bright, and of significant blob width, while image 1631 of reflector 1625 is conversely smaller in width and less bright. These effects are presumably due to the angulation of the mirrors and the mirrors away from the dispersive elements of the screen. In some tests the image 1631 has been non-existent when threshold levels used to digitize the image are set high enough.

As one can imagine, when the rocker is in position 2, the situation is reversed, and it is image 1631, which is bright and big, and 1631 which is comparatively dark. The clear difference in these images in these two conditions, allows one to easily discern which position the rocker switch is in.

If the switch has an in between neutral position, then the images are more or less equal in size and brightness, being less than in the one condition, but more than the other, and this Neutral condition can also be determined.

A three position switch may be constructed in a similar manner, where the two signals from reflectors 1610 and 1625 are similar, the switch is in the in between or neutral position. Such switches are common for use in automobile instrument panels for mirror adjustment radio functions and seat functions, which have timed motor or other travels, the time in a given direction derived from the time that directions' switch function is held down.

If desired a third reflector 1640 (dotted lines) in the neutral position can be added to cause a maximal reflection from the middle portion in this condition.

A rocker switch like the above can be constructed wherein the central portion in the area not containing the reflectors can be transparent such that projected light on the screen can be projected either through the screen (if the diffusing portion of the screen is removed, or the screen slotted in the region desired) and onto a scattering surface such as 1650 on the top of the rocker switch and so to the users eye, in the manner of knob 1545 or slider 1550. Alternatively, if the screen is diffusive, data projected on the screen can be seen through the switch, albeit with some obscuration at angles off the screen normal at the switch location.

It is noted that a two or three position slider type switch can be built using the slider teachings of FIG. 10.

The operation of this rocker switch is based primarily on the much higher intensity of light reflected from a reflector near and parallel to the screen, and increase in width of the reflector in the camera image. A thresholded image for example, of the two reflector states (parallel and close to the screen, versus angled away, with larger distance from the screen) results in a significantly larger width seen for the reflector near and more or less parallel the screen (and thus perpendicular to the camera axis). The effect is due to synergistic combination of increased frontal area presented by the reflector to the camera, the reduction in diffusion from the screen for objects close to the screen and the affect of angulation of a bright reflector in directing returned reflected light away from the light source and camera axis which are in most cases relatively parallel. Other physical details and other switches than rocker types can also make use of one or more of these effects. See for example FIG. 22.

It should be noted that the computer based machine vision system can be programmed to learn from the data entered by the user, the desired settings for control and display purposes. For example, the user can turn the knobs or move the slider of FIG. 10 to a particular desired setting, for example of temperature and can instruct the computer via voice commands (via voice recognition system not shown for clarity described in copending applications) or otherwise enter a desire that the knob in a certain setting correspond to that temperature condition. This cannot be done with manual temperature control, since the knob always sets the same actuator condition when it is in the same rotational position.

The system can also learn from images returned from the screen, what the norm for the system is at that time. For example, if the last 100 images (which could be acquired only over 2-5 seconds say) have all had the knob targets within a certain position and range of reflection intensity values and/or blob size or shape values, and the next test image shows them in a different position, with a possible increased in size in a given rotational direction, one can use this information to predict that the knob is being moved in that direction, which causes a blur to occur in the target data. This blurred data will typically be reduced in intensity at any one point from the previous norm.

In work to date, the invention in all embodiments has functioned well for sensing a night or in modest daylight conditions. And it has functioned in all cases for the sensing of physical details. This is largely because the datum's on the knobs for example, are shadowed by the knob itself.

But what about the fingers in daylight conditions, particularly with variant sunlight on the screen? Unlike the situation with targets on the back of knobs, for example, in the touch sensing use of the invention, the light reaching the camera (or other electro-optical sensor if used) is not shielded from sunlight or other ambient light in the passenger compartment or other region where the user such as a driver is located.

In a vehicle application, there is a particularly large variation in ambient lighting conditions in the passenger compartment to which the screen of the invention interfaces. This variation ranges from dead black at night, with no lights on in the car or in the vicinity, to bright sun pouring down thru the windshield, or a sunroof, directly on the screen. This situation can also occur with sun coming in from the side at certain times.

In addition, the background from whatever source is not constant and varies dynamically as the car drives down the road, under overpasses, past trees, etc. And the light on the screen varies in many cases across the face of the screen due to shadows caused by various members of the vehicle or its surroundings, or the passengers within.

The question then is, what does it take to operate over this range? And secondarily for the bright direct sun case, is it required to so operate, since such lighting will wash out virtually any information displayed anyway, as it does today on displays which are in the open (and not hooded as most instrument clusters are for this reason).

I believe it is essential that the unit operate in all cases but the washout one, but even then I feel it should sense the physical details such as knobs, which then could be used for critical items to which washout of data was not an issue. In some cases this could require printing of characters on the screen (or an overlay) in addition of projected characters if it was necessary to always read something. In other cases the system optionally could, upon sensing via the camera of a super bright condition in the region of a certain knob (or the whole screen) switch over to a voice description of knob position for example if the actual the projected knob lettering could not be seen.

In general, direct bright sun can overpower the effect of any light source with in the unit. One answer to this is singularly or in combination to:

Use the peculiar shadow effect of the finger contact area when back illuminated.

Use the peculiar bright effect of finger contact when front illuminated and the fact that the shadow and front illuminated contact areas are substantially the same.

Use the shadow outline of the finger, especially when the finger is close to the screen, and edge contrast of the shadowed finger is highest.

Use the time sequential indication of finger touch images as one presses into the screen Use specialized cameras or other detectors whose integration time or other sensitivity can accommodate the very wide dynamic intensity range required and the rapid changes in light intensity at different portions of the screen at different times.

Use a deflection based system which does not depend on light intensity for the answer, Use another form of touch screen entirely, an appendage so to speak. This is always an option but is not "Free" like the optical ones (assuming the optical is used for knobs and such), and thus is not appealing for high volume use. A high-grade touch screen of the capacitive field type can add $100 in volume.

In the case of touch icon box actuation, we know the regions of interest where to look for touch apriori. In this case, we can:

Modify camera function locally to optimize exposure for each region independently. This can be done using programmable regions of interest processing for example, where each region has its own criteria, which can be set from its immediate surroundings. It should be noted this can be done in a general way, even if we don't know where to look a priori. One can if desired utilize a logarithmic response, or lin-log response CMOS or other camera (a FUGA brand, or SMALL brand) for this purpose, which is not bloomed or otherwise made unreliable, or inoperable by massive sun load.

I have found that by comparing the finger with the projection light on, to the projection light off, but shadowed, that a good answer can be found in all cases tested to date. I have also found that just looking at the finger in the high background condition, without reliance on the projection light at all (From auxiliary LED source or the data projector) can also be used. This has been treated in co-pending applications, but consider FIG. 17a (, where finger 2200 is touching screen 2201 of the invention in a typical manner indicative of a push of a button, such as virtual radio presets. The camera 2220 observes the back side of the screen, and the image 2260 obtained is processed by computer 2250. In this case, the finger is flattened a bit at the end 2205 pressed by the person into contact with the screen, and this flattened area effectively shadows the sun light 2210, even though other portions of the screen are extremely bright. As a result, shadow region 2215 in the camera image 2220 can be sensed and compared to the bright region 2225 around it. This has been found to work for persons of both black and white races (and presumably other races as well), since the fingers on their tips are light colored, and the portion in contact with the screen expands (and changes shape to axially align with your finger) as you press it into the screen, which I believe is due to blood being pressed out of your finger.

For a gray background or hazy sun day much the same occurs. For example, In one test run with gray background, the width of the middle finger tip contact in touch with the screen pushing in and viewed only with background light (projection off) was 42 pixels, with a black level of 20, where light level of radiation near the finger coming through the 3/16 inch thick 3M vikuiti beaded screen was 160. With the finger 1/2 inch off the surface of the screen, the black area was 33 (rather than 42 in contact) pixels wide, and with a considerably higher "black" level of 35 units. Thus degree of black and its size are both changed when objects such as a finger are not in contact with the screen, thus allowing this to discriminate. The area (as opposed to just width) of "black" in a continuous closed "blob" changes even more and is unique relative to all other candidate images considered to date.

The computer in the simplest case is used just to determine the area of blob (i.e. a pixel count) above a detector voltage related threshold set for finger touch to operate in this mode in order to determine which icon if any has been touched.

When dynamic subtraction of frames with LED powers on versus off is undertaken, the subtracted images are those of first the off screen finger position, to the on screen finger condition, if the approach is relatively slow enough such that two frames can be taken in the region of interest in question can be compared to the projector front lighted finger condition, when subtracted for example In the case where we know where the shadow can be if it is to be used to make selections (E.g. on a projected preset), we can just look in those regions (e.g. 2221 and 2222 in image 2260), and if we have sensed a bright sun condition for example by looking at the sum of camera pixels in the image, if a shadow (i.e. a region of dark in a sea of bright) roughly round or somewhat oblong is there, like 2215, then one can assume that's a finger and determine if it is touching the button location in question. In this case it is determined that it is touching in the region of projected button 2221. Shape and area can be usefully combined into one algorithm if desired.

The above data indicates one can build a touch function based on the much larger image from a finger tip pressed into the screen, to further include if desired, shape, and the change in size and shape as someone first touches, to final touch. If one scans fast enough (e.g. 500 scans per sec say) to catch the difference it is a good indicator of someone purposely in contact with the screen at the position detected. Consider for example FIG. 17b. This illustrates the image 2270 taken wherein the finger first touches the screen 2201, and the image 2271 taken a fractional second later when the screen has been pressed by the finger, to the heavy press condition indicated by image 2272 where the finger has been pushed enough to be bent at the last joint to provide a longer contact area (and thus bigger image area) to the camera. The fraction of a second could be still shorter if the person pressed his finger rapidly into the screen, which is often the case. In this instance the time delay could be under 10 milliseconds. Pixel addressing cameras, if required, can be used to catch such rapidly changing data. It should be noted that while most measurements could be made on the inward push, that is with the larger contact area being determined to be after the lesser, one could also measure this function on withdrawal of the finger, or on a relaxing thereof. For example, one could first give a big finger push, then relax it in order to purposely cue the system. In this case one might look not a two, but three or more subsequent images. The cue could for example, be when one determines that the condition small to large to small (or lesser say) has occurred.

It would appear that since this is always the case, it is a good way to sense the presence of a touch and not some stray finger or object near but not touching the screen. And stray objects in contact with the screen will not in general exhibit this behavior either. However at this juncture there still are some issues. For example, if a person has a bandage on his finger tip this does not work in such a predictable fashion, though returned signal levels and the extent of the width are higher than the normal finger tip case, for all tested types of bandaids.

In some cases it may be desirable to program the computer vision system to learn the characteristics of a persons finger touch, either in the size at a given reflectance or shadow level, shape, rate of change of size or shape, or color.

For example, while people of different races all seem to have light colored finger tips, there is a degree of difference. The invention comprehends determining this difference and adjusting the detection criteria accordingly. For example, a color camera can be used, and the color of reflection determined, and then used in a look up table of criteria values. This may in many cases be possible just with a monochrome camera to sense gray shades.

In a similar manner people have different sized fingers, and the camera used can determine the average size, and use it in subsequent analyses. Some people may have a characteristic way in which they touch the screen, also from a characteristic direction (often dependent on their size). All of these determinations, color/shade, touch characteristic and size can be determined ideally in a teach mode, for example on starting the car (where the touch screen is in a car). Or they can be determined by monitoring the operation of the device in normal use.

Another way to sense finger touch location in the presence of background light in the passenger compartment, is to sense and determine the location of the edges of the shadowed finger, and use the edge shape to predict where the finger is. This can make a prediction of location of the tip of the finger, even without the hard contact needed for the black shadow condition above. In this case with the edges off the screen, the finger shadow is grayer but still very distinguishable as a finger. This is also because the typical car of today has nobody in the front middle passenger position, and the drivers finger has to approach the screen from a range of known angles, thus the range of shadows in this manner is relatively confined. However, the variability of this is still a problem It should be noted that when a specific shadow condition is indicative of a finger in one instance, and a bright spot is indicative in another, then one can effectively solve for both, and if either is present, one can determine finger presence. And certainly if both are in the same place (this can occur when the finger reflects projected light from the region being shadowed due to finger contact, but where the background light is intense enough to shadow the remaining part of the finger around this zone, which does not reflect sufficiently as is not in contact.

A shadow can be caused on the screen by something other than a finger, so it is usually important to look for shadows that have finger like shape and/or reflection characteristics. This also includes the unusual effects around the edge of the finger when strongly illuminated from behind, which creates a gray boundary apparently due to light leakage around the finger and through the skin at the edge of the finger.

It is also or additionally possible to determine the general outline of this gray region and predict where the finger tip is. A Sobel transform of the image gives the outline in many cases of the total finger extension, particularly when the projection device (E.g. LEDS) is turned off such that no projected light returns from the finger. This technique can act as a check on a finger location determined from the black shadow indication or the projected light reflection or the comparison of those two.

Another method is to compare touch at different locations. For example, assume there are 5 radio buttons more or less in the same region of the screen. It is known logically that only one of the 5 will be touched and the other 4 purposely not touched. By cross comparison of light from the area of the buttons (no matter on what principle is used) one can find the one (touched) whose signal that does not correlate with the others (untouched).

Another method is to look for movement due to the touch—like using ones finger as a slider, moving across the screen. This is more difficult as a tracking function is required. But if one takes "N" readings of data, one can determine a trend in the data (e.g. movement from right to left on the screen). In many instances, even if a particularly reading cannot be obtained, the function can be satisfactorily provided to the user (e.g. heat increased).

It should be noted too that the reflectors on the knobs/sliders switches if used can be retro reflecting corner cubes, or scotchlight material or alternatively diffuse reflective material, to suit the characteristics of lighting used to illuminate them.

To recap, for bright sun conditions, knobs and other physical devices can typically be constructed in such a way that their very shape and location shadows light from the sun or other sources in the passenger compartment. Thus for those items, the projected light (from data projector or auxiliary source) is what is used to sense, in either day or night condition.

For the case of fingers sensed by machine vision processing of direct camera images, then for sunlit conditions, it is useful to look for the black shadow of the contacted finger and compare that to the projected reflection image at the same location—which is thus shadowed. This answer can be further compared to the finger edge outline condition, which if present confirms the finger location. We note however, that sometimes other fingers can also be seen under such shadow conditions, so the edge outline case may not by itself be satisfactory. And since the sun can be at an oblique angle to the screen, the finger edges being away from the screen, cast a shadow which is displaced from the dark shadow of the tip, and if the finger shadow edges (which are often gray except at their innermost portions where the light cant leak through the finger or diffract around it) are used for finger tip prediction, this displacement must be taken into account.

It should also be noted that for extreme sun conditions, when the screen washes out at least in ones ability to view data projected on it satisfactorily, that the invention comprehends sensing this condition, and increasing the projection or other display brightness or contrast. In addition, the display can change color, even to the point of switching to a negative image of what was previously displayed, if that aids in distinguishing data in sunlit conditions.

This change in brightness, contrast or color can also be performed selectively in those regions washed out, leaving the others unaltered, or not as much changed, to leave a degree of continuity with previous information. This is also true because in many cases the sun problem is fleeting, and adequate display conditions are restored after a short while.

The invention contemplates that one can take a measurement of the background condition on the screen with no light projected if desired, and choose the right algorithm for that condition. Or one can run all the algorithms, and perform a test to see if any one predicts a finger being on a known point where a touch could occur, and generally speaking predict that touch result if any one predicts it (assuming all algorithms have a minimum of false accepts). For example, if radio buttons are projected as the only icons of the moment projected, one just tests the light situation at the icons in questions to determine if a touch has occurred, A method of discriminating against background noise caused by extraneous light sources is to use a monochromatic wavelength of illumination, such as an IR LED or laser and filter the return to the camera. With the LED sources of choice this can by itself discriminate against most conditions other than direct sun. A further method is to modulate the light source at a high frequency and demodulate the detection. With CMOS and other such TV cameras this can be achieved to a degree by electronically shuttering the camera, leaving it open, only when illumination light (e.g. from an IR LED) is projected FIG. 18 illustrates a camera in a vehicle used to input control signals to a entertainment system or other device. As shown in FIG. 18 a camera 2360 connected to computer 2301 is located in the headliner or overhead housing of a vehicle roof 2361 and positioned so as to observe a region of one or more of the rear seats where passengers, often children are seated, and presumably buckled in.

To operate a camera, one generally needs IR LED or other light sources to illuminate the areas to be sensed when daylight conditions or other suitable lighting is not present. This can be easily provided by locating such sources typically in the headliner, for example even inside the housings of normal lighting of the vehicle. For example, in a overhead or side mounted dome light housing.

The use of such a camera type application has several appealing aspects. First it can look at different data, even simultaneously, such as physical switches parts of persons for example This can be used to detect for example gestures of passengers made with their fingers, hands, head or other portions of their body, or with objects held in their hands.

The location of a persons body portion or other datum location, can be determined relative to a previously determined position, or absolutely relative the cameras image field. Or as is often desirable, relative to some other point or points nearby which are fixed, such as trim indicia 2330 on seat back 2331. Even if the camera should move a small amount, as it might due to vibration, the relative data is available in such manner as to determine the desired input from the relative location.

The approach herein allows the vehicle manufacturer or aftermarket provider to provide added functions to rear seat passengers, without running wires or power in the vehicle—a big saving in a crowded space. And the camera image may acquire (and the computer processing thereof senses) a great number of points at once.

This is useful for example if one has a DVD player overhead, and you want each person in each of 4 rear seats in a minivan to be able to operate it. Today, to do this safely (that is with each person buckled up) one would have to have two and possibly 4 control panels. All this costs a lot of money—and precious space. With the invention of this embodiment a single camera for example may acquire the data to do this. It is especially made easier if an easy to see artificial high contrast target or plurality of targets is used, which to make it fun, could be on a special glove or had the child or other person would wear—a "DVD Hat" as it were. For examples, see FIG. 9 of this application and the copending referenced applications and referenced patents For example a child 2350 in a rear car seat 2351 of a minivan 2352 who is belted in wants to change the show on the DVD player screen 2355 overhead. Today he can not do this. But using camera 2360 in the roof 2361 of the vehicle, the invention allows the position of his hand 2365, or a movement thereof to be determined, which in turn can be used to control the DVD player to switch scenes, discs, or whatever. Alternatively, the system can be programmed to effect such a change when he nods his head for example. This also has value for disabled persons riding in wheelchairs in vehicles for example.

The invention can be used as well for home control applications, for example of ones range, microwave, fridge, washer, dryer, stereo, TV etc. This desirably shares economies of scale with the automotive application, as well as potentially its control layout which allows ease of operation of both car and home, while both are aided because knowledge of its use is also shared with historic devices, particularly washers, dryers, and ranges almost all of which have knob based control panels.

The screen of the invention too can show TV programs, especially nice for a control mounted in the Kitchen as it likely would be. With a lens/mirror change a projector version of the invention can even be reconfigured to project large screen TV images on a wall of an adjacent family room for example.

The video display can also serve to see live video of baby's room or front door (assuming cameras are placed there and properly interfaced by wireless or other means), access the internet (also using the computer in the invention, see general purpose discussion below), wireless video feeds from cell phones etc.

The display of a baby room, a front door porch, swimming pool or other important location can be in a window of the whole display (like picture in picture) if desired.

Figure 19:
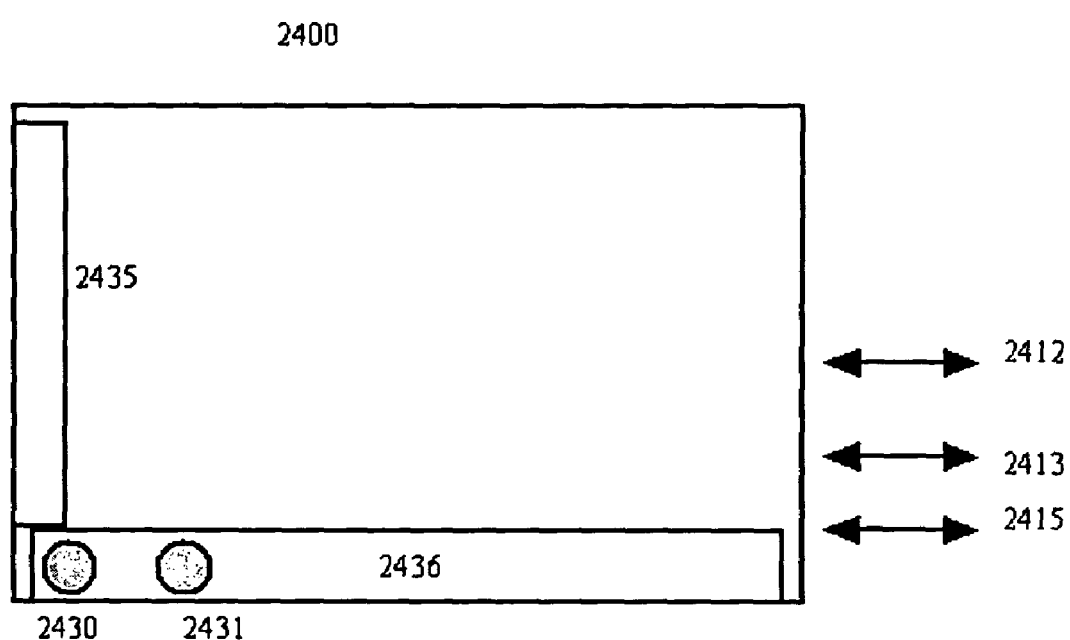
FIG. 19 illustrates an embodiment of the invention suitable for use in the kitchen or other room in a home.

Consider FIG. 19 which illustrates a wall mounted RTD 2400 of screen/control surface size 53 cm×90 cm roughly based on an existing Samsung model 4367w 43 inch diagonal DLP projection HDTV. In side the TV housing, A TV camera and wide angle optics of the invention has been further incorporated with the device to allow RTD functions to be performed when the screen is not being used for TV Pictures. A computer not shown takes in data from the various touch or physical detail functions, and controls the system, the projection and the input/outputs 2412, 2413 and 2415 to representative appliances such as stereo system dishwasher and stove. Other functions can be controlled as well, including virtually everything in the home if connected via wireless or conventional I/o devices.

As has been pointed out the knobs 2430 and 2431 can be of the familiar radio motif and they may be, for example, along the sides in region 2435, or bottom region 2436 as shown, in which case the projected screen diagonal 2440 in HDTV 16:9 format is somewhat less than the original 43 inch size. Note that the person in the kitchen watching the screen can immediately act on the data seen. For example baby's room can be immediately zoomed in just by touching the picture, which finger touch is detected by the camera of the invention and used by computer to control the display and/or perform some other action, such as turning on a microphone in baby's room for example which can be heard in the kitchen via the TV sound system.

The two knobs maintain the familiar metaphor of the radio, and can control any appliance function, using in addition virtual touch or even added physical knobs switches or sliders.

While shown on the wall of the kitchen other locations may also be of interest. Intercoms throughout the whole house can be connected using units of this type, either wired or wireless. Such units would be smaller typically, and perhaps built using LED based projectors. In the bathroom the unit may be used to control plumbing functions. And where data projection embodiments are employed, with information gathered without contact, the actual control surface interacted with by the user has no electrical wiring, aiding safety in such a situation.

Even the appliances themselves can be built with such units if desired, and it is noted that the surfaces of stoves, washers and other equipment can become a control surface if desired using the invention, especially since the projector unit can be remote from the surface, as can the sensing unit. This is not shared with any other method of control.

The projected display of the RTD may also be redirected via a mirror or other optical element to display on a different surface, perhaps at a higher magnification. This could be useful for diverting a kitchen display temporarily to display on a wall of an adjacent family room, at little added cost.

It should be noted that LED sources could be utilized to augment a normal white light projector. For example, they can be used as a back up to a white light bulb, so that in the case of bulb failure, the LED or LEDs can be used to provide usable screen illumination if need be. The LED can be on all the time as a supplemental source, or energized when bulb burn out is detected. And it may not be necessary in this case to have all colours displayed, thus LEDs with particularly powerful and visible wavelengths may be used, without regard for having a beautiful white balance. To a degree this is true in all cases, if one does not wish to represent true color images on the screen. The later is desirable, but not needed for control or other vehicle operational purposes.

Another method of continuing operation in case of bulb failure is control the projector to illuminate only key portions of the RTD screen with a backup LED or LEDs. This allows the LED power to illuminate smaller areas, resulting in higher power density in the region illuminated.

Finally, another example is the case of an RTD control using virtual controls on the touch screen portion, and physical controls (knobs, dials, sliders, switches, any or all) on another portion (which also may have touch capability too). Typically the virtual portion would be the top portion, the physical the lower, but not necessarily. The reason for this would be to put the expansive image portion capable of providing backup and other images in the line of sight of the driver. This portion would not be cluttered with physical devices, generally speaking. And key controls could be a bit lower and out of main the sunlight load (see below). In some sloping instrument panels, the region at the top may slope away from the driver and be hard to reach as well, again arguing for controls to be lower down.

It is desirable that the most critical controls be physical, since they are easiest for people to understand today, and importantly, they can be easily grasped and worked, even if the total control space is brightly illuminated by sunlight which can tend to wipe out both the displayed image and cause potential trouble for some kinds of touch sensing. One can also use the sensed data from the camera (or other electro-optical sensor of controls and fingers) of the invention to control the illumination power to increase it where sunlight is tending to wash the display out. In some cases this could mean changing colors of the display as well in order to produce colors such as green, which are more readily viewable by the person, assuming that the projector itself can produce green as efficiently as red, for example. One would particularly be interested in making the display bright in critical areas around key functions too. In is not necessary on a large type display having video image areas to necessarily increase all areas at once, and thus in some cases such as scanned laser projectors such as FIG. 6 above, one would then scan for example only the key areas, but scan them more often, effectively increasing the duty cycle for those regions and thus the perceived light in them.

Where the computer used in the invention for image processing and display is a general purpose processor (e.g. Intel Pentium 4 based) and software (such as a Microsoft Windows), it is possible for the computer to be used for general use in the home, or in the car when stopped, and the system is easily integrated with other optional hardware or software from others. And because the machine vision processing is included to solve for knob or finger location, it is possible to use the image processing function to solve for other events as well. This is especially true, since the demands for control per se using turning of physical details or finger touch are relatively infrequent.

For example, it can be used to monitor baby position, in the car or in the home. It can be used for a variety of vehicular tasks such as lane following, observation of cars on the right or left and their position, and so forth. All this is possible as the vision is essentially free, if one has it there anyway and provides it in general purpose form.

In this situation it is desirable to prioritize the tasks to be performed, giving priority to acting on the drivers commands, and safety issues exterior to the vehicle, and least priority to those related to relatively low priority acts such as monitoring persons in the vehicle.

One such optional machine vision processing use mentioned in previous applications has been for backing up. A task, which can have high priority, as it is stressful, but only, lasts a short while. It is unlikely any other control functions are required while doing this. The vision processor can find the edges of vehicles or other objects potentially in the way, and particularly where stereoscopic cameras are employed, determine in real time the distances to them as an aid to the driver. This is much more data than possible with simple ultrasonic sensors used for backing warnings today, and in addition can show on the video display, where the problem is. Conversely, as also noted previously, the driver can touch the problem portion of the image he sees on his backing up view displayed and the camera and vision processing portion of the invention can continually monitor that location. Or cause a digital zoom to show more of it Machine vision processing can also monitor switch locations of controls in the front or back seat areas if cameras are placed there for observing same.

It is noted that the calibration of the screen using a digital matrix array of photo detectors as the sensor, avoids analog calibration drift experienced in many touch screen designs, while still allowing high resolution On another note, it has been estimated that 60% of the vehicles on the highway have only the driver in them. It would thus be safe to say that 80% or more have only the driver and the passenger in the right front seat. The typical provision of the vents high in the center stack, in the middle of the dash, is likely to provide the best air distribution to the 20% or less of the passengers in the rear seat, as well as fresh air to the face of the driver and passenger, though this is also achievable with vents in other places. And these vents for the purpose of rear seat passengers could be even less required, given the trend toward special rear compartment vents in cars having rear seats. (Today nearly all higher-class vehicles have this now)

So then is it necessary to have vents high in the center stack? They are there to give best distribution at lowest cost, and to allow the driver and passenger to direct them on their face. But I feel they are also there because there is no really valuable thing to put in their place. In other words to make having an alternative arrangement valuable enough to compensate for the relatively small disadvantage, or extra cost, entailed.

I feel that the invention changes this equation. The valuable thing for both safety and convenience to provide a display, and especially an interactive display, such as that of the invention, in the drivers best line of sight high on the center stack/dash. The invention is not limited to this arrangement, however it is thought that location of the vents to the sides, or to the bottom, or somewhere else entirely (e.g. a user controllable pop-up vent on the top of the dash) frees up this very valuable space. Or thin vents without a lot of area could be used even in the center stack, with airflow possibly boosted by higher pressure fan motors It also should be noted that for a larger instrument panel display (e.g. 12-15 inches diagonal, assuming a pure rectangular format, which it doesn't have to be), only two technologies seem today to cost effectively apply—neither one being the conventional LCD Flat Panel Display used for automotive navigational displays and the like and generally 5-7 inch diagonal format. The first is rear projection of displayed information on to a simple passive screen/control surface. In this case, a small low cost display chip so to speak with a large number of pixels is magnified by projection optics to fill the screen, or alternatively one or more beams (of different colors) is swept raster fashion by a simple xy mirror scanning device which itself may be a semiconductor or other chip (e.g. a Microvision company MEMS type). Both types used for rear projection can use solid state light sources, such as lasers or LEDs, particularly if a wide range of color fidelity is not required, the case in many control system applications using the invention.

The second method thought to be economic in the future, will be Organic light emitting diode displays (OLEDs), which may contain a large number of low cost addressable emitting elements. Here again, we can expect to employ this technology sooner if color fidelity is not needed. This can be used many in the invention, but less easily.

It should be noted that for near term use in automobile instrument panels, full color presentation is not required (though admittedly nice). The same holds true for high pixel display resolution. The invention can use monochrome, two color, three color, or any combination of colors including full renditions as the financial justification of the application allows. This issue is particularly of interest as one considers ultra long lifetime solid state sources, which today may not provide high grade color rendition The invention allows the commonly used controls, like the climate control or radio to be utilized in a conventional manner, compliant with FMVSS 101. But the space is shared with other control functions. In addition, a large display is provided in addition, which serves as well as an auxiliary control surface to have virtual controls While machine vision and electro-optical techniques have been shown to determine control detail and/or finger position, other non-contact techniques, while less preferable may be used such as inductive or capacitive devices. It is possible to consider sensing methods contacting the screen as well, but the elegance and interchangeability of the invention is diminished.

It also should be noted that while automotive applications have been highlighted, because of their need for tactile function, the invention is usable for a multitude of such as point of sale devices, to Information kiosks, to home automation and control functions, to factory controls, etc.

In many of the above embodiments, a TV camera and associated image processing are used to determine both the rotational or xy position of various physical devices such as knobs, and/or the position in xy of a finger touch.

In other applications and patents including those referenced above I have described a new type of instrument panel which uses optical images displayed on a screen in which control details such as knobs are mounted. In other cases the knobs have been mounted to an overlay in front of the screen. Display functions have typically been provided by rear projection, which has the further advantage of allowing the position of knobs and other details or finger touch to be detected from behind the screen, most desirably with a single optical system such as a TV camera. In some other embodiments, flat panel display technologies such as LCD screens have been illustrated, and in still further embodiments, display technologies such as OLED displays have been shown which allow a curved screen, desirable for automotive or other stylistic purposes.

Disclosed now are some variants to the above invention, in which the knobs and physical control details are alternatively detected In the first, these details are electro-optically sensed from the side, either in their portion which penetrates to the back of the screen, or by looking through the screen (or overlay) from the side—implying a thicker screen, but such is often the case in Automotive use anyway.

The second arrangement uses fine wires, or transparent conductors, provided on or in the screen or overlay to allow electrically based sensing of knobs and other details. This is much more conventional and requires one sensing device per detail. This is especially easy to implement with the projection display, since the screen surface may be of plastic and the wires easily embedded in it, or conductors laminated to it or whatever.

Both these new arrangements may be used with OLED displays, which are thought to be a desirable future benefit. OLED displays, like rear projection ones can employ curved screens of stylistic value in vehicles. The new arrangements may also be used, like those previous, with optical or other touch sensing methods which may be additionally incorporated to make a complete instrument panel control system.

Both arrangements disclosed herein may be used with force feedback to the person using the device, as has also been disclosed in my previous applications.

FIG. 20 illustrates an alternative RTD arrangement with conventionally sensed knobs (or other physical details) using connections comprising electrical wire or fiber optic means. In this case the knob may be located on an overlay placed in front of a display of any type, or may be directly on the screen itself, particularly when a projection display is used.

Figure 20A:
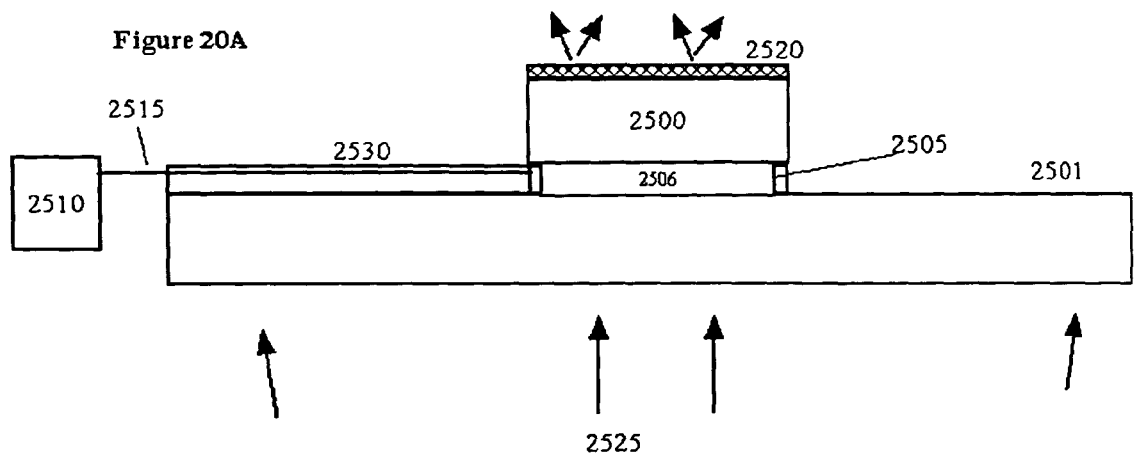
FIG. 20 illustrates an alternative method for sensing knobs and other details on a screen.

The first embodiment of this type, shown in FIG. 20a uses a conventional knob 2500 mounted to an electronic sensor of position such as a incremental optical encoder 2505 the encoder in turn is mounted to Plexiglas screen 2501 (for example of the type shown in FIG. 7) with adhesive or other suitable means. The encoder is sensed conventionally, using for example phase quadrature based readout electronics 2510 connected to the encoder 2505 via cable 2515. In this particular case an annular encoder with a clear center region 2506 is illustrated, such that the knob (which may be transparent with a surface 2520 which can be a diffusing screen, for example of ground glass or 3M Vikuiti material) may be illuminated with information contained in light 2525 from a suitable projector (not shown).

Because the wires are typically unsightly, a trim strip 2530 of chrome, or black or some attractive color or finish may be attached to screen 2501 by adhesive or other means to cover the wire from view by passengers located on the knob side of the screen.

Figure 20B:
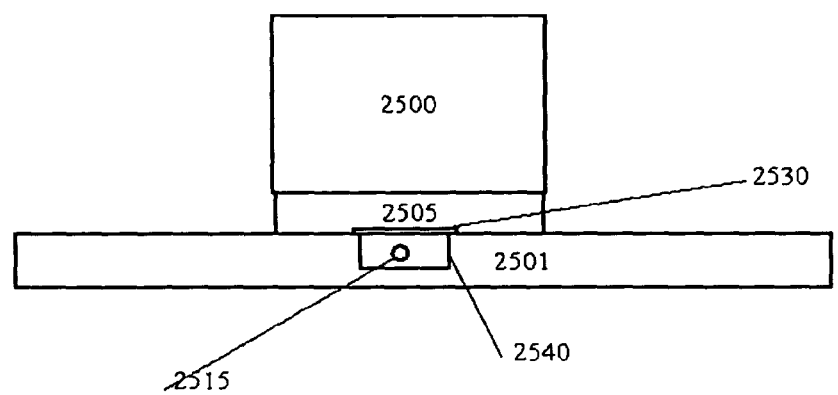

In a preferred embodiment, shown in FIG. 20b the cable 2515 can be run in a channel 2540 in the screen, with the trim strip 2545 in this case filling in the channel and flush with the surface of the screen as shown.

As an alternative to the wires shown, it is possible at extra cost to use transparent conductors to route electrical signals to and from the encoder and its readout electronics. These conductors may be deposited on the front or back of the screen member for example, or in an in-between laminated layers. Use of such conductors mitigates the need to use up space on the screen with trim strips. However such strips can be useful stylistically and therefore not represent the waste that otherwise might be the case.

It is also possible to route signals by fiber optic cable means so as to detect knob movement with all electronics remote to the knob. This has an advantage in that screens can be interchanged without connection to electronic devices. This is especially easy when incremental knob movement is to be detected.

These alternative arrangements may be used with OLED displays which are thought to be a desirable future benefit. Especially since OLED displays, like rear projection ones can employ curved screens of stylistic value in vehicles. The new arrangements may also be used, like those previous, with optical or other touch sensing methods which may be additionally incorporated to make a complete instrument panel control system.

Figure 21:
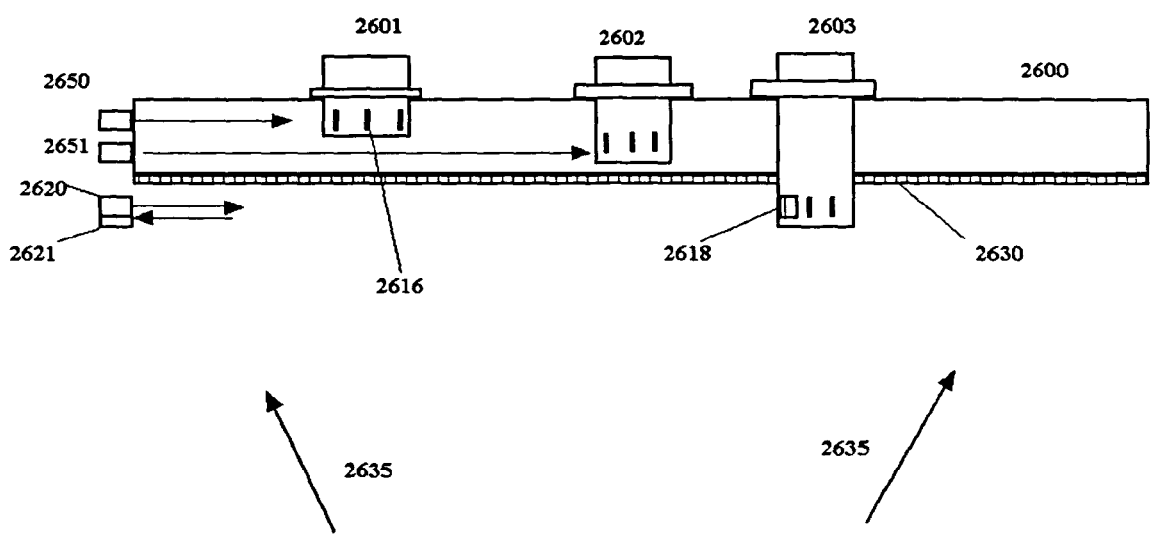
FIG. 21 illustrates an alternative electro-optical method for sensing knobs and other details on a screen.

FIG. 21 illustrates an alternative embodiment with knobs (or other physical details) electro-optically sensed from the side of the screen/display surface, or an overlay thereon, and in some cases through the screen material or the overlay. As shown there are three knobs 2601 and 2602 and 2603 which are rotatable and held by means not shown in screen/control surface member 2600. Each knob has on its bottom circumference, target datum's such as 2618 or 2616 which reflect light, in this case light from a LED light source for example 2620, which reflection is sensed by a photo diode 2621. As the knob is rotated the photo detector alternately sees light or not depending on whether the reflector is in position to send light back. By counting the number of reflections the amount of knob movement can be determined from a given starting point.

As shown source 2620 projects through air, on the projector side of the screen. But other two knobs in this case are shown to be viewed, by light source detector combinations 2650 and 2651, thru the screen material (such as lexan sheet, on which 3M Vikuiti dispersive beads such as 2630 are used for rear projection 2635, or alternatively 2630 could be an OLED display for example) from the side, which screen material is sufficiently transmissive of light at the wavelength used. This is generally the case with IR LED's at 880 nm for example. Absolute reading systems with coded targets can be provided. For example 2618 as shown, has a second target close to the first, which identifies this particular location, for example, a knob home position.

FIG. 22 illustrates a pushbutton switch according to the invention. In this example a pushbutton 3100 slides up and down in housing 3105 and is opposed by a resilient member as known in the art, such that it is urged with no finger pressure applied to its outer most face 3110 to stick out from the screen 3120, and with finger pressure is moved inward toward the screen, typically up to a fixed stop, for a two position switch as is commonly the case. In this one illustrative example, the resilient member is a leaf spring 3130 which is in this example shiny, such that it serves a second purpose—namely to reflect light from a light source 3135 back to a camera 3140, in a manner similar to other reflective datum's discussed herein (The camera and light source are typically farther away than shown, and the drawing is not to scale, with the switch represented much larger by comparison for clarity.). In this case however, the reflective member distorts with compression by the force of the finger and becomes more flat and thus reflective, as shown in the dotted lines 3131. The difference of the image field picked up by camera 3140 is pronounced in terms of the width image having of a signal level above a certain threshold Vt, as shown in the image field 3150 for the switch outward from the screen state, and image field 3160 for that fully compressed (dotted lines). The difference in the two states can be used to set the on or off condition of the switch or some other state criteria. The intensity threshold level Vt, and the width threshold such as w can be used to set the trigger point for the change in state. Where desired the switch can be used for more than two states, since a plurality of trigger points for a plurality of states can be set up, for example with different w values. For this to be effective some mechanical feel is desirable in the push button arrangement to indicate the different states, although the projector can be as in other embodiments, used to signal a condition selected, such as TRACTION OFF, when the switch is pressed. And TRACTION ON when it is pressed again.

Figure 23:
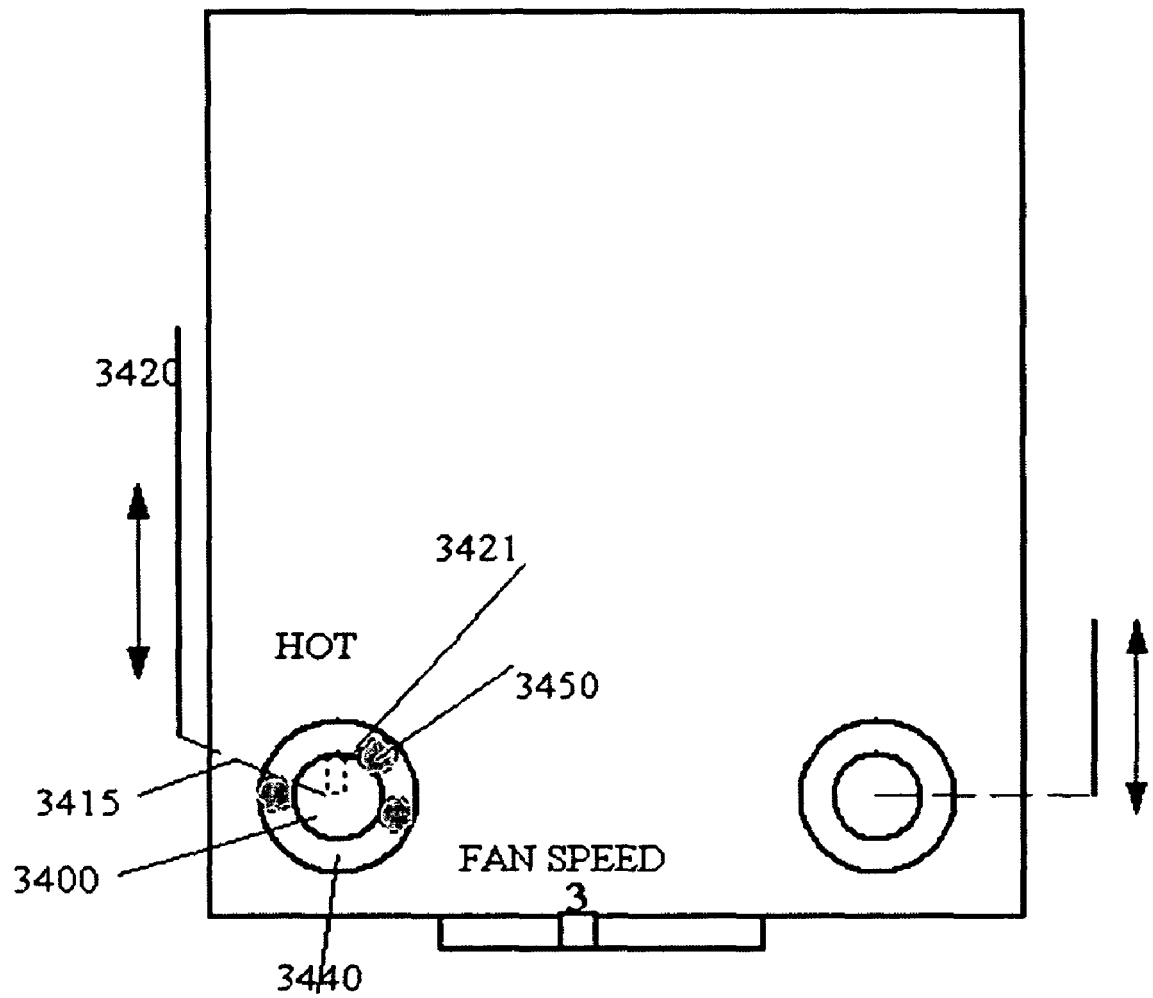
FIG. 23 illustrates a center stack configuration including manual activated functions and dual control knobs and sliders.

FIG. 23 illustrates a center stack configuration for vehicles that use sliders or knobs for direct manual actuation of temperature or air distribution doors, or that are used to directly switch motor currents, such as for Fan motors. These types of controls are typically employed in lower cost vehicles for the HVAC functions, and most typically today, one sees three knobs for this purpose. Such vehicles also have, in a Center stack section above or below the HVAC controls, an audio section with radio, tape player CD or whatever. A third section if present generally has auxiliary switches.

It is desirable to use the invention to combine the HVAC and Audio controls into one unit, which then frees up space on the instrument panel to accommodate a maximum display area. This display is largest particularly if virtual controls are used for auxiliary functions for the audio, HVAC and other controls, which virtual functions can be minimized or eliminated in favour of a large image displayed, for rear view, for watching DVDs when parked, or important video or telematic information from traffic sources or the like.

In the particular version shown a dual ring knob arrangement is used for the two knobs, and a slider off the display at the bottom, with the data pertaining to its location and value displayed on the screen just above. It. This maintains the maximum free display area.

As shown, knob 3400 is mounted to screen 3410 in a manner similar to those examples of FIG. 11. However in this case the center of knob 3400 is attached to a lever 3415 which is used to pull or push an actuating rod 3420 (or other suitable mechanical transmission device) used to actuate a temperature mixing door not shown, or other actuator to be controlled by the knob. The rotational position of this knob can be seen by a camera as discussed in FIG. 10 for example, using datum 3421 on the rear surface of the knob (dotted lines) and thus used to control the function and display information relating to its position, in this case temperature related, such as the words HOT or COLD. The region on the screen on which projection of data to the screen is interrupted by the lever is, for best visual aesthetic effect, either covered by a trim piece, or not projected on (i.e. projection is dark in this region) so as to not illuminate the lever.

Two knobs may be collocated to save space. For example, also shown is a second knob 3440 rotating around the first, 3400. This knob, which is not connected mechanically to any actuator is only for electronic controlled functions in this example, and is sensed by the camera as well, using datum's such as group of three datum's 3450, like 1533-1535 in FIG. 10a for example on its rear surface. This knob can be used then to operate an electronically variable function such as radio volume, using the computer to decode the camera signals, and convert the information into a radio volume related output such as a voltage, to an amplifier unit.

While discussion is made of only the left knobs, used for the temperature door actuation and volume, the same holds true for the right knobs which would typically be used for air distribution and radio tuning. Alternatively other functions could be enabled.

The slider shown is used to switch fan speeds by known electrical contact means, with the camera unit of the invention sensing the slider position, and displaying data related thereto on the screen above the slider. In this case the camera is sensing datums of physical controls both on the screen (the knobs) and off (the slider handle). A portion of the slider generally need not protrude above the slider to overlap the screen, since one can have a projected pointer indicate the position of the slider, and other projected information indicating the value selected for example, such as fan speed of 3 shown. Other versions can be built with the slider completely on the screen if desired.

It is noted that because all data presentation is programmable, that one can have a presentation of information telling the driver what function he may perform, or should perform, with the control as well. For example, if the driver sets the fan speed to 5, the computer can cause to be displayed a suggestion that on air conditioning functions the coldest setting of the temperature knob will be too cold, if the air distribution knob is set to defrost, as just one example. In a fully automatic system this sort of thing would be taken care of automatically, but since the system is manual, hints to the operator are useful.

It is noted that even though the slider is mounted off the screen/control surface, its datum can if desired be seen by the same camera (or cameras if desired) to see the knob data and the virtual indications entered by finger touch on icon boxes or the like.

The slider could be mounted on the screen, as can other sliders if desired. Two other sliders of the dual knob and slider version shown in FIG. 10b can replace the function of the dual knobs, thus a three slider version at the bottom of the screen could take up even less vertical space.

It is also noted that rather than use two knobs concentric with each other such as 3400 and 3440, one can use a single knob which can be for example pulled out by the user in order to disengage it from the mechanical linkage used to actuate a function.

For example, knob 3400 in this situation would still be able to be monitored for its position by the vision system determination of the rotational position of datum 3421. Thus in this outward free turning state of the knob 3400 can be used for example to control radio volume. When desired for it to control the mechanically actuated function again (eg temperature) it is pushed back to engage the linkage.

While not necessarily exhaustive of all the possible benefits, I would at this point like to sum up some features of the invention which add to both economical cost and outstanding safety and functionality in the Automobile Instrument Panel Application 1. First, the invention is primarily based on physical controls such as knobs, sliders, dials, and switches which are familiar to all, but at the same time further allows for inexpensive additions of virtual touch related functions.
2. Second it provides a major improvement to the Instrument panel today, namely that it allows the Radio and heater (audio and climate) to be provided in classical arrangements, but time sharing the same space, if desired, thereby freeing space for other functions such as video displays or virtual control functions, and/or allowing the individual controls of the Radio and Heater to be easier to use, both from a tactile and legibility point of view.
3. Third, It provides more display and control space in general, as it allows the displayed information to go right to the extremes of available space, and use any available space, even if curved or irregular—completely impossible with LCD Flat panel displays for example. And it allows data to even be projected into the center of knobs and sliders and switches saving more space, while allowing better visibility or both. The added control space also allows simpler and larger controls (e.g. knob diameter or switch size) to be used, a key feature for many drivers, And virtual controls can also be larger and more easily touched and actuated as well.
4. Fourth it allows for active tactile feedback to both actuation of knobs and physical controls, or virtually displayed touch functions. This feedback is in addition to any passive tactile feedback afforded by grooves ridges or the like in the screen or overlay surface.
5. Fifth, the invention allows the total display surface to in effect become a touch screen at virtually no extra cost to that needed for knobs and the like. And because all sensing is non-contact in the preferred embodiment, the whole screen and control surface can be interchanged which makes it easy to accommodate multiple models and car lines, saving even more money (especially since the individual components are dropping in price rapidly). The knobs indeed can even be put on with adhesive, and thus changed in type or position (along with software as required) by the user or aftermarket vendor as well as the manufacturer.
6. Sixth, The invention does all of the above in a manner that meets or exceeds existing US Federal Motor Vehicle Safety Regulation 101 for Controls and Displays. Because of this, costs may be saved and Instrument panel or passenger compartment "Clutter" reduced by bringing in more of the vehicle controls to such a reconfigurable device.
7. The display may be quite bright if desired, much more easily seen in various sunlit situations. And if visibility problems for certain drivers are present, the lettering and figures can all be increased in size. (Possibly requiring other less important data to be left off, and perhaps accessed in a separate operation)

Phrased in other words, the RTD invention herein disclosed and in other pending applications, is outstanding in the are areas of Functionality, Safety, Style and I believe, Cost as well. Safety also includes compliance with Government regulations such as FMVSS 101—this could be a $5^{th}$ major item by itself, since many of the competitive approaches to the functionality issue, don't comply. (E.g. I drive), and thus cant replace as many functions, and thus cant have the big display etc. The arguments are intertwined.

Functionality is enhanced, due to:
Big lettering
Big controls
Familiar controls—knobs etc. Least learning curve of any reconfigurable system (we think)
But also can have virtual controls via touch screen
Can have big easy to work virtual controls, as lots of touch screen space-thus finger gestures possible (slider, turn, etc)
Lots of room for communication data (phone, telematics, vehicle functions
Biggest possible display (because can best share space with controls). Up to 8 times the area of a conventional 7 inch diagonal LCD display put into similar instrument panel real estate, e.g. for navigation purposes
Biggest possible display when needed (e.g. may switch from instruments to backup cameras, or to navigation when needed. Made easier due to big display, with ability to squeezed down less important data)
Interactive display when desired. Whole thing may be a touch screen
Completely interchangeable screen and physical controls at almost no cost. This is initially a big benefit for the manufacturer who can differentiate car lines and packages easily (also with software changes to match). It could also allow one to customize a rental car to your own instrument panel preference.
Safety
Really good features for all drivers, but especially elderly or disabled
Big lettering
Big controls
Familiar controls—knobs etc. Least learning curve of any reconfigurable system I believe. Best for rental cars, other occasional use vehicles
Biggest possible display (because can best share space with controls)
Best for backing up with camera data input
This best enables ease of use of video camera data from vehicle or smart highway functions (e.g. at intersections) and other safety related data to be displayed (e.g. road conditions)
Affordable, meaning more people can use it, thus becomes more standard and easy to use from vehicle to vehicle.
Passive safety enhanced by relative freedom of choice of screen material—an important issue as screen size increases
Active feedback to touch commands and knob positions and switch positions can optionally be provided, allowing minimum glance time (or operation entirely by feel).
Passive relief details can easily be provided on the screen to also enhance tactile operation
Style
In the near term, only a projection type display which the RTD of today uses can be curved and of the requisite materials for passive safety (a bigger issue as the screen gets bigger). This fits exactly the style trends of today
In addition, the screen can be irregular in shape, and have objects inserted into it (E.g. CD), or through it (like a gear shift lever). This allows total freedom stylistically and placement wise in the instrument panel. The RTD thus isn't really "in" the instrument panel, but rather it becomes the instrument panel. It isn't just another display device like an LCD flat panel display.
There is total freedom of materials choices too. And one can change screens/control surfaces to suit individual buyers or groups of buyers. Change in all regards, not only in software, but also in hardware, either materials and shapes or controls.

Cost

The RTD continues to appear less costly than a conventional instrument panel having electrically controlled HVAC and a sound system. It may in time be less expensive than even today's low line vehicle center stack The RTD saves further, if the comparison is to a instrument panel having a conventional (Eg 5-7 inch diagonal) flat panel LCD display, and even more so if it is a conventional touch screen type.

The RTD saves still more if one would put the instruments and gages (eg Speedometer, fuel) in the center stack, like the Toyota Echo or Saturn ION vehicles today.

The RTD can be mounted easily as a single self contained unit. All controls and display hardware with a minimum of interconnects. The camera or other electro-optical sensing device of the invention can also be used to sense and input data to the computer of the invention to correct the brightness or color of the projected data in response to changes in screen background or light sources.

FMVSS 101 is contained in USA CFR Title 49 part 571. "Light" as used herein includes all electromagnetic wavelengths from ultraviolet to near infrared.

The foregoing discussion should be understood as illustrative and should not be considered to be limiting in any sense. While this invention has been particularly shown and described with references to preferred embodiments thereof, it will be understood by those skilled in the art that various changes in form and details maybe made therein without departing from the spirit and scope of the invention.

What is claimed is:

1. A method of playing a variable game on a member surface comprising the steps of:
   providing a display controlled by a computer to display a game related video image;
   providing an inanimate physical game play object on top of a surface of a member through which the game related video image is viewed by a player of the game;
   moving said inanimate physical game play object on the surface of the member and on top of the displayed video image by said at least one player;
   sensing, after movement of said inanimate physical game play object on said surface, information concerning said inanimate physical game play object on said surface;
   using said computer, analyzing said information to determine the position of said inanimate physical game play object on said surface; and
   from said analysis determining a game related parameter.

2. A method according to claim 1, wherein said determining step determines the location of said inanimate physical game play object on the surface with respect to one or more features of said displayed video image viewed through said surface.

3. A method according to claim 1, wherein determining step determines the location of said inanimate physical game play object on the surface with respect to another physical object on said surface.

4. A method according to claim 1, including the further step of changing said displayed video image viewed through said surface as a result of said determined position of the inanimate physical game play object on the surface.

5. A method according to claim 1, including the further step of providing via the computer an audio signal as a result of said determined position of the inanimate physical game play object on the surface.

6. A method according to claim 1, including the further step of modifying said displayed video image as a result of an action of the player in the game being played.

7. A method according to claim 1, including the further step of producing said displayed video image by rear projection onto the rear of a substantially transparent surface screen member.

8. A method according to claim 1, including the further step of producing said displayed video image by front projection onto the front of said member surface.

9. A method according to claim 1, including the further step of producing said displayed video image by one of a large screen LCD or other flat panel display.

10. A method according to claim 1, including the further step of sensing the information electro-optically.

11. A method according to claim 1, including the further step of sensing said information with a TV camera.

12. A method according to claim 1, including the further step of having said inanimate physical game play object slide or roll on said display surface after being launched by an action of a player.

13. A method according to claim 1, including the further step of playing the game with a plurality of players controlling the movement of different inanimate physical game play objects, including the further step of identifying the inanimate physical game play objects with corresponding players using said sensed information.

14. A method according to claim 13, wherein said identifying step uses at least one of color, size, or shape of the inanimate physical game play object.

15. A method according to claim 1, wherein said inanimate physical game play object is a marker used in a board game.

16. A method according to claim 1, including the further step of providing additional image data on said display surface.

17. A method according to claim 1, including the further step of modifying portions of said displayed video image to suit a player's interests.

18. A method according to claim 1, including the further step of changing said displayed video image to that of another game.

19. A method according to claim 1, wherein said surface is substantially horizontal.

20. A method according to claim 1, wherein said member is substantially similar in size to a HDTV screen, and substantially larger than said inanimate physical game play object.

21. A method according to claim 1, including the further step of accessing, with said computer, a particular internet site relating to one of said determined position or other game parameter.

22. A method according to claim 1, including the further step of making said member so that said member may be interchanged with another member whose surface has a one of a different shape or surface characteristic.

23. A method according to claim 1:
   wherein said moving step moves the inanimate physical game play object relative to an x-y plane of the surface and relative to an x-y plane location of a game feature associated with the surface;
   wherein said sensing step senses the moving of the inanimate physical game play object in the x-y plane and provides x-y position information of the moving inanimate physical game play object;
   wherein said using step analyzes the x-y position information of the moving inanimate physical game play object to determine a predetermined proximity of an x-y position of the moving inanimate physical game play object to the x-y plane location of the game feature; and
   wherein, said determining step uses the predetermined proximity of the x-y position information of said inanimate physical game play object relative to the x-y plane location of the game feature to determine the game related parameter.

* * * * *

UNITED STATES PATENT AND TRADEMARK OFFICE
CERTIFICATE OF CORRECTION

| | |
|---|---|
| PATENT NO. | : 8,287,374 B2 |
| APPLICATION NO. | : 10/934762 |
| DATED | : October 16, 2012 |
| INVENTOR(S) | : Pryor |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1338 days.

Signed and Sealed this
Nineteenth Day of May, 2015

Michelle K. Lee
*Director of the United States Patent and Trademark Office*